US006980321B2

(12) United States Patent
Ramanujan et al.

(10) Patent No.: US 6,980,321 B2
(45) Date of Patent: Dec. 27, 2005

(54) METHOD AND APPARATUS FOR PRINTING HIGH RESOLUTION IMAGES USING MULTIPLE REFLECTIVE SPATIAL LIGHT MODULATORS

(75) Inventors: Sujatha Ramanujan, Pittsford, NY (US); David Kessler, Rochester, NY (US); James E. Roddy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 990 days.

(21) Appl. No.: 09/933,385

(22) Filed: Aug. 20, 2001

(65) Prior Publication Data

US 2003/0035123 A1    Feb. 20, 2003

(51) Int. Cl.[7] .............................................. G06K 1/00
(52) U.S. Cl. ....................... 358/1.2; 358/296; 347/239; 347/241; 347/255; 347/256
(58) Field of Search .......................... 358/1.1, 1.2, 3.32, 358/505, 511, 512, 296, 300, 302; 347/239, 347/241, 255, 256

(56) References Cited

U.S. PATENT DOCUMENTS

| | | | |
|---|---|---|---|
| 4,728,965 A | 3/1988 | Kessler et al. | |
| 5,061,049 A | 10/1991 | Hornbeck | |
| 5,231,388 A * | 7/1993 | Stoltz ........................... | 345/84 |
| 5,325,137 A | 6/1994 | Konno et al. | |
| 5,461,410 A | 10/1995 | Venkateswar et al. | |
| 5,461,411 A | 10/1995 | Florence et al. | |
| 5,463,468 A * | 10/1995 | Takanashi et al. .......... | 358/296 |
| 5,626,411 A | 5/1997 | Takahashi et al. | |
| 5,652,661 A | 7/1997 | Gallipeau et al. | |
| 5,701,185 A | 12/1997 | Reiss et al. | |
| 5,715,029 A | 2/1998 | Fergason | |
| 5,721,622 A | 2/1998 | Venkateswar | |
| 5,727,860 A | 3/1998 | Broer et al. | |
| 5,743,610 A | 4/1998 | Yajima et al. | |
| 5,743,612 A | 4/1998 | Matsuda et al. | |
| 5,745,156 A | 4/1998 | Federico et al. | |
| 5,754,305 A | 5/1998 | DeClerck et al. | |
| 5,805,274 A * | 9/1998 | Saita ........................... | 355/38 |
| 5,808,800 A | 9/1998 | Handschy et al. | |
| 6,215,547 B1 * | 4/2001 | Ramanujan et al. .......... | 355/67 |
| 6,247,816 B1 * | 6/2001 | Cipolla et al. ................ | 353/31 |
| 6,330,018 B1 * | 12/2001 | Ramanujan et al. ........ | 347/239 |
| 6,407,766 B1 * | 6/2002 | Ramanujan et al. ........ | 347/239 |
| 6,580,490 B1 * | 6/2003 | Wong et al. .................. | 355/40 |
| 6,628,317 B2 * | 9/2003 | Enomoto et al. ........... | 347/234 |
| 6,646,716 B1 * | 11/2003 | Ramanujan et al. .......... | 355/67 |

* cited by examiner

*Primary Examiner*—Tommy Lee
(74) *Attorney, Agent, or Firm*—Nelson Adrian Blish

(57) ABSTRACT

An apparatus and method of printing images onto a photosensitive media (140) using multiple reflective spatial light modulators (87, 88, 89, 90, 95, 97). In the apparatus and method, illumination optics uniformize and image light from at least one light source (20) through polarization beamsplitting elements (60, 63). The polarization beamsplitting elements (60, 63) divide the illumination light into two polarization states. One polarization state of the illumination light illuminates the reflective spatial light modulators (87, 88, 89, 90, 95, 97) in a telecentric manner. The reflective spatial light modulators (87, 88, 89, 90, 95, 97) are addressed with image data signals. The reflective spatial light modulators (87, 88, 89, 90, 95, 97) modulate the polarized illumination light on a site by site basis and reflect the modulated light back through the polarization beamsplitting elements. The modulated light beams are combined to form an image, which is directed through a print lens assembly (110) to expose a photosensitive media (140). The position of the spatial light modulators (87, 88, 89, 90, 95, 97) can be changed, and a new image can be printed.

116 Claims, 9 Drawing Sheets

METHOD AND APPARATUS FOR PRINTING HIGH RESOLUTION IMAGES USING MULTIPLE REFLECTIVE SPATIAL LIGHT MODULATORS

CROSS REFERENCE TO RELATED APPLICATIONS

Reference is made to commonly-assigned copending U.S. patent application Ser. No. 09/606,891, filed Jun. 29, 2000, entitled A METHOD AND APPARATUS FOR CORRECTING DEFECTS IN A SPATIAL LIGHT MODULATOR BASED PRINTER, by William M. Barnick, the disclosure of which is incorporated herein.

FIELD OF THE INVENTION

The invention relates generally to a method for spatially and temporally modulating a light beam and more specifically to forming a high resolution image on photosensitive media.

BACKGROUND OF THE INVENTION

Image recording systems write digital data onto photosensitive media by applying light exposure energy. Such energy may originate from a number of different sources and may be modulated in a number of different ways. Image recording systems can be used for digital printing, whereby digital image data is used to print an image onto photographic paper or film.

One of the early methods used for digital printing was cathode ray tube (CRT) based systems. In a CRT based printer, the digital data is used to modulate a CRT, which provides exposure energy by scanning an electron beam of variable intensity on a phosphorescent screen. This technology has several limitations related to the phosphor and the electron beam. The resolution of this technology is inadequate when printing a large format image, such as 8 inch by 10 inch photographic prints. CRT printers also tend to be expensive, which is a severe shortcoming in cost sensitive markets such as photoprocessing and film recording. An additional limitation is that CRT printers do not provide sufficient red exposure to the media when operating at frame rates above 10,000 prints per hour.

Another commonly used approach to digital printing is the laser based engine shown in U.S. Pat. No. 4,728,965. Digital data is used to modulate the duration of laser on-time or intensity as the beam is scanned by a rotating polygon onto the imaging plane. Such raster scan systems use red, green, and blue lasers. Unfortunately, as with CRT printers, laser based systems tend to be expensive, since the cost of blue and green lasers remains quite high. Additionally, there is limited availability of compact lasers with sufficiently low noise levels and stable output for accurate, artifact-free imaging.

Due to reciprocity failure, photographic paper and film media are not suitable for color imaging when using a laser light source. High intensity reciprocity failure is a response phenomenon by which both photographic paper and film are less sensitive when exposed to high intensity light for a short time period. For example, raster scan laser printers expose each pixel within an image frame for a fraction of a microsecond, whereas optical printing systems expose the full image frame on paper or film for a longer duration, typically on the order of seconds. Thus, special paper and film are required for laser printers.

In an effort to reduce cost and complexity of printing systems, as well as avoid reciprocity failure, alternative technologies have been considered for use in digital printing. Among suitable candidate technologies under development are two-dimensional spatial light modulators.

Two-dimensional spatial light modulators, such as the digital micromirror device (DMD) from Texas Instruments, Dallas, Tex., or a liquid crystal device (LCD) can be used to modulate an incoming optical beam for imaging. A spatial light modulator can be considered essentially as a two-dimensional array of light-valve elements, each element corresponding to an image pixel. Each array element is separately addressable and digitally controlled to effect image modulation by manipulating the polarization state of light, thereby allowing or blocking transmission of incident light from a light source. Polarization considerations are, therefore, significant to the overall design of support optics for a spatial light modulator.

There are two basic types of spatial light modulators currently in use. The first type developed was the transmission spatial light modulator which, as its name implies, operates by selective transmission of an incident optical beam through individual array elements. The second type, a later development, is a reflective spatial light modulator. As its name implies, the reflective spatial light modulator, operates by selective reflection of an incident optical beam through individual array elements. A suitable example of an LCD reflective spatial light modulator relevant to this application utilizes an integrated Complimentary Metal Oxide Semiconductor (CMOS) backplane, allowing a small footprint and providing improved uniformity characteristics.

Spatial light modulators provide significant advantages in cost, as well as avoiding reciprocity failure. Spatial light modulators have been proposed for a variety of different printing systems, from line printing systems such as the printer disclosed in U.S. Pat. No. 5,521,748, to area printing systems such as the system disclosed in U.S. Pat. No. 5,652,661.

A single spatial light modulator such as a Texas Instruments digital micromirror device (DMD) disclosed in U.S. Pat. No. 5,061,049, can be used for digital printing applications. One approach to printing using the Texas Instruments DMD, shown in U.S. Pat. No. 5,461,411, offers advantages such as longer exposure times using light emitting diodes (LED) as a source. Thus, reciprocity problems associated with photosensitive media exposed for short periods are eliminated. However, DMD technology is expensive and DMD devices are not widely available. Furthermore, DMDs are not easily scaleable to higher resolutions, and the currently available resolution is not sufficient for all digital printing needs.

Several photographic printers using commonly available LCD technology are described in U.S. Pat. Nos. 5,652,661, 5,701,185, and 5,745,156. Most of these designs utilize a transmissive LCD modulator such as those depicted in U.S. Pat. Nos. 5,652,661 and 5,701,185. While such methods offer several advantages in ease of optical design for printing, there are several drawbacks to the use of conventional transmissive LCD technology. Transmissive LCD modulators generally have reduced aperture ratios. Thin Film Transistors (TFT) on glass technology does not yield the pixel to pixel uniformity required in many printing and film recording applications. Furthermore, in order to provide large numbers of pixels, many high resolution transmissive LCDs have a large physical footprint. With footprints of several inches, such devices can be difficult to adapt when combined with a lens designed for printing or film recording applications. As a result, most LCD printers using transmissive technology are constrained to either low resolution or small print sizes.

To print high resolution 8 inch by 10 inch images with at least 300 pixels per inch requires 2400 by 3000 pixels. Similarly, to print high resolution images onto film requires at least 2000 by 1500 pixels, and can require as much as 4000 by 3000 pixels. Transmissive LCD modulators with sufficient resolution for such printing applications are not readily available. Furthermore, the grayscale depth needed for each pixel in order to uniformly render a continuous tone print over the frame size is not available with this technology.

The use of a reflective LCD serves to significantly reduce the cost of the printing system. Furthermore, the use of an area reflective LCD modulator sets the exposure times at sufficient length to minimize or eliminate reciprocity failure. The progress in the reflective LCD device field made in response to needs of the projection display industry have provided opportunities in printing applications. Thus, a reflective LCD modulator designed for projection display can be incorporated into a printer design with little modification to the LCD itself. Also, designing an exposure system and data path for a printer using an existing projection display device allows incorporation of an inexpensive commodity item into the print engine.

For printing applications, the most suitable reflective LCD devices incorporate a small footprint with an integrated CMOS backplane. The compact size along with the uniformity of drive offered by such a device translates into better image quality than is available using other LCD technologies. There has been progress in the projection display industry towards incorporating a single reflective LCD, primarily because of the lower cost and weight of single device systems. See, for example, U.S. Pat. No. 5,743,612. Of the LCD technologies, the reflective LCD with a silicon backplane can best achieve the high speed required for color sequential operation. While this increased speed may not be as essential to printing as it is for projection display, higher speeds can be utilized to incorporate additional grayscale and uniformity correction into printing systems.

The recent advent of high resolution reflective LCDs with high contrast in excess of 100:1, presents possibilities for printing that were previously unavailable. See, for example, U.S. Pat. Nos. 5,325,137 and 5,805,274. Specifically, a printer may be based on a reflective LCD modulator illuminated by a lamp, by lasers, or by an array of red, green, and blue light emitting diodes. The reflective LCD modulator may be sub-apertured and dithered in two or three directions to increase the resolution.

Reflective LCD modulators have been widely accepted in the display market. Most of the activity in reflective LCD modulators has been related to projection display, such as is disclosed in U.S. Pat. No. 5,325,137. Several projector designs use three reflective LCD modulators, one for each of the primary colors, such as the design shown in U.S. Pat. No. 5,743,610.

It is instructive to note that imaging requirements for projector and display use (as is typified in U.S. Pat. Nos. 5,325,137; 5,808,800; and 5,743,610) differ significantly from imaging requirements for digital printing onto photographic paper or film. Projectors are optimized to provide maximum luminous flux to a screen, with secondary emphasis placed on characteristics important in printing, such as contrast and resolution. To achieve the goals of projection display, most optical designs use high intensity lamp light sources. Optical systems for projector and display applications are designed for the response of the human eye, which, when viewing a display, is relatively insensitive to image artifacts and aberrations and to image non-uniformity, since the displayed image is continually refreshed and is viewed from a distance. However, when viewing printed output from a high-resolution printing system, the human eye is not nearly as forgiving to artifacts and aberrations and to non-uniformity, since irregularities in optical response are more readily visible and objectionable on printed output. It is instructive to note that the gamma for human eye response when viewing projected images in a dark room is approximately 0.8. In contrast, the gamma when viewing printed output in normal lighting is approximately 1.6. As a result, small artifacts are more easily visible in printed images than in projected images, complicating the task of providing uniform exposure energy for printing applications. It is also instructive to note that projectors are typically designed for presentation of motion images. With motion images, due in part to varying image content and artifact motion, image variations are not easily perceptible to the human eye. This is in contrast to stationary images, in which artifacts tend to be stationary and, therefore, more visible.

Even more significant differences between the projection and printing imaging environments are differences in resolution requirements. Adapted for the human eye, projection and display systems are optimized for viewing at typical resolutions such as 72 dpi or less, for example. Apparatus used for printing onto photographic paper or film must achieve much higher resolution, particularly apparatus designed for micrographics applications, which can be required to provide 8,000 dpi for some systems. Resolution of a printed image can be enhanced by image displacement, by dithering, or by performing multiple exposures. The short time interval that exists between the display of different images makes increasing the resolution by using these techniques impractical. Thus, while LCD spatial light modulators can be used in a range of imaging applications for projection and display to high-resolution printing, the requirements for supporting optics can vary significantly.

A preferred approach for digital printing onto photographic paper and film uses a reflective LCD based spatial light modulator. Liquid crystal modulators can be a low cost solution for applications requiring spatial light modulators. Photographic printers using commonly available LCD technology are disclosed in U.S. Pat. Nos. 5,652,661; 5,701,185; and 5,745,156.

Although the present invention primarily addresses use of reflective LCD spatial light modulators, references to LCDs in the subsequent description can be generalized, for the most part, to other types of spatial light modulators, such as the previously noted Texas Instruments DMD device.

Primarily because of their early development for and association with screen projection of digital images, spatial light modulators have largely been adapted to continuous tone (contone) color imaging applications. Unlike other digital printing and film recording devices, such as the CRT and laser based devices mentioned above that scan a beam in a two-dimensional pattern, spatial light modulators image one complete frame at a time. Using an LCD, the total exposure duration and overall exposure energy supplied for a frame can be varied as necessary in order to achieve the desired image density and to control media reciprocity characteristics. Advantageously, for printing onto photographic paper and film, the capability for timing and intensity control of each individual pixel allows an LCD printer to provide grayscale imaging.

Modulator printing systems can incorporate a variety of methods to achieve grayscale. Texas Instruments employs a time delayed integration system that works well with line arrays as shown in U.S. Pat. Nos. 5,721,622, and 5,461,410. While this method can provide adequate gray levels at a reasonable speed, however, line printing Time Delayed Integration (TDI) methods can result in registration problems and soft images. Alternate methods have been proposed particularly around transmissive LCDs such as the design presented in U.S. Pat. No. 5,754,305.

Dithering has been applied to transmissive LCD systems as one way to correct for a less than perfect fill factor. Incorporating dithering into a reflective LCD printing system would allow high resolution printing while maintaining a small footprint. Also, because the naturally high fill factor present in many reflective LCD technologies, dithering action can be omitted with no detriment to the continuity of the printed image.

Alternative forms of optical dithering are used to improve resolution in display systems incorporating LCD modulators. For example, a calcite crystal or other electro-optic birefringent material can be used to optically shift the path of an image beam, where the degree of shift is dependent on polarization characteristics of the image. This allows shifting one component of an image with respect to a second component of the image that has a different polarization. See U.S. Pat. Nos. 5,715,029 and 5,727,860. In addition to the use of birefringent material, U.S. Pat. No. 5,626,411 employs the principle of refraction with isotropic optical media having different indices of refraction used to displace one image component from a second image component. These methods of beam displacement are used in a dynamic imaging system and serve to increase resolution by interlacing raster lines in order to form two lines of sub-images. The two sub-images are imaged faster than is perceivable to the human eye, so that the individual images are integrated into a composite image as seen by the observer. While these methods are appropriate for projection imaging systems, they are not suitable for a static imaging system such as printing.

While the reflective LCD modulator has enabled low cost digital printing on photosensitive media, the demands of high resolution printing have not been fully addressed. For many applications, such as imaging for medical applications, resolution is critical. Often, the resolution provided by a single reflection LCD modulator is insufficient. It then becomes necessary to form an image by merging multiple images in order to create a single high-resolution image. It is preferable to form such a merged image without artifacts along border areas or in regions where image data overlaps. While juxtaposing or spatially interweaving image data alone may have been attempted in previous applications, such superposition of images with the use of reflective LCDs provides images of high quality without compromising the cost or productivity of the print engine. Further, by utilizing polarization based modulation, a print engine can utilize light already available in the optical system.

Juxtaposing or spatially interweaving image data has been attempted with some success in projection displays. U.S. Pat. No. 5,715,029, describes a method to improve resolution of a display by altering the beam path using a birefringent medium such as a calcite crystal or an electro-optic liquid crystal cell. For projection applications using a transmissive LCD, Philips Corporation deflects the beam path by using birefringent elements as is disclosed in U.S. Pat. No. 5,727,860. Another method, using isotropic optical elements to juxtapose or spatially interweave images in a projection display using a transmissive LCD, is described in U.S. Pat. No. 5,626,411.

Thus, it is desirable to have a low cost, high-resolution, high speed method for digital printing onto a photosensitive media that avoids reciprocity failure and preserves adequate grayscale.

SUMMARY OF THE INVENTION

It is an object of the present invention to provide a method and apparatus for printing images onto a photosensitive media using multiple reflective spatial light modulators. It is a further object of the invention to provide for a high pixel density image at the photosensitive media exposure plane. The present invention is directed at overcoming one or more of the problems set forth in the background of the invention.

Briefly, according to one aspect of the invention, imaging light from at least one light source is directed through at least one uniformizing optics assembly and through a plurality of polarizing beamsplitter elements to create a telecentric illumination at the plane of each reflective spatial light modulator in a digital printing system comprising a plurality of reflective spatial light modulators. Each reflective spatial light modulator, in turn, comprises a plurality of modulator sites in two dimensions. Upon being addressed with image data signals, each reflective spatial light modulator modulates the polarized illumination light on a site by site basis and reflects the modulated light back through the polarized beamsplitting elements. The modulated light beams are combined to form an image, which is directed through a print lens to expose a photosensitive media. The position of the spatial light modulators can be changed, and a new image can be printed.

In one embodiment of the invention, a first spatial light modulator is located on a portion of a first facet of a first polarization beamsplitter and a second spatial light modulator is located on a portion of a second facet of the first polarization beamsplitter. A third spatial light modulator is located on a portion of a first facet of a second polarization beamsplitter and a fourth spatial light modulator is located on a portion of a second facet of the second polarization beamsplitter. A fifth spatial light modulator is located on a portion of a first facet of a third polarization beamsplitter and a sixth spatial light modulator is located on a portion of a second facet of the third polarization beamsplitter.

The plurality of spatial light modulators can be distinct in their operation with respect to wavelength of illumination, drive voltage, temperature, image data addressing signal, or aspect ratio. Additionally, in order to improve contrast, polarization elements may be incorporated on at least one facet of the polarization beamsplitting elements in the printing system.

In another embodiment of the present invention, a first reflective spatial light modulator and a second reflective spatial light modulator are illuminated in a telecentric manner by a first light source. A third reflective spatial light modulator and a fourth reflective spatial light modulator are illuminated in a telecentric manner by a second light source. A fifth reflective spatial light modulator and a sixth spatial light modulator are illuminated in a telecentric manner by a third light source.

In yet another embodiment of the present invention, each light source is activated using a series of pulses of varying amplitude and duration to provide illumination of varying light levels to the plurality of reflective spatial light modulators. In this way, the available grayscale of the reflective spatial light modulators is extended.

In a further embodiment of the invention, at least one of the spatial light modulators is moved to multiple distinct locations displaced at a predetermined distance, the distance a function of the reflective spatial modulator site size, in order to create multiple images. This approach, referred to as dithering, provides additional resolution at the image plane. The movement of each of a plurality of spatial light modulators can be synchronized.

In an additional embodiment of the invention, the print lens assembly can be switched from an assembly that magnifies a complete image onto photosensitive media to an assembly that demagnifies the complete image onto photosensitive media. Thus, a small print area can be created with a demagnification print lens assembly, and a larger print area can be created with a magnification print lens assembly.

In another embodiment of the invention, a blur filter can be located in the path of the modulated light beam. The blur filter sufficiently alters the modulated output light beam in order to blur each pixel of an image which is exposed on a photosensitive media, thereby making it difficult to distinguish any pixel from its neighboring pixels.

In a further embodiment of the invention, color sequential illumination results in at least three distinct color images.

In an additional embodiment of the invention, multiple images are printed monochromatically.

In another embodiment of the invention, multiple images are printed simultaneously.

In yet another embodiment of the invention, the illumination source is switchably either monochromatic or polychromatic, based on illumination requirements of a particular photosensitive medium.

A primary advantage of the present invention is the ability to produce high resolution images without perceptible reciprocity failure. Furthermore, a reflective LCD modulator is sufficiently fast so that a printer according to the present invention can create grayscale images without using time delayed integration. For this reason, an apparatus according to the present invention can effectively mask image artifacts using image superposition without introducing substantial mechanical or electrical complexity. The bulk of artifact reduction takes place in software algorithms designed for image correction.

The illumination system has been described with particular reference to a preferred embodiment utilizing LEDs as the light source. It is understood that alternative light sources and modifications thereof can be effected within the scope of the invention.

The invention and its objects and advantages will become more apparent in the detailed description of the preferred embodiment presented below.

DETAILED DESCRIPTION OF THE INVENTION

The present description will be directed in particular to elements forming part of, or in cooperation more directly with, an apparatus in accordance with the present invention. It is understood that the elements not shown specifically or described may take various forms well known to those skilled in the art.

Figure 1:
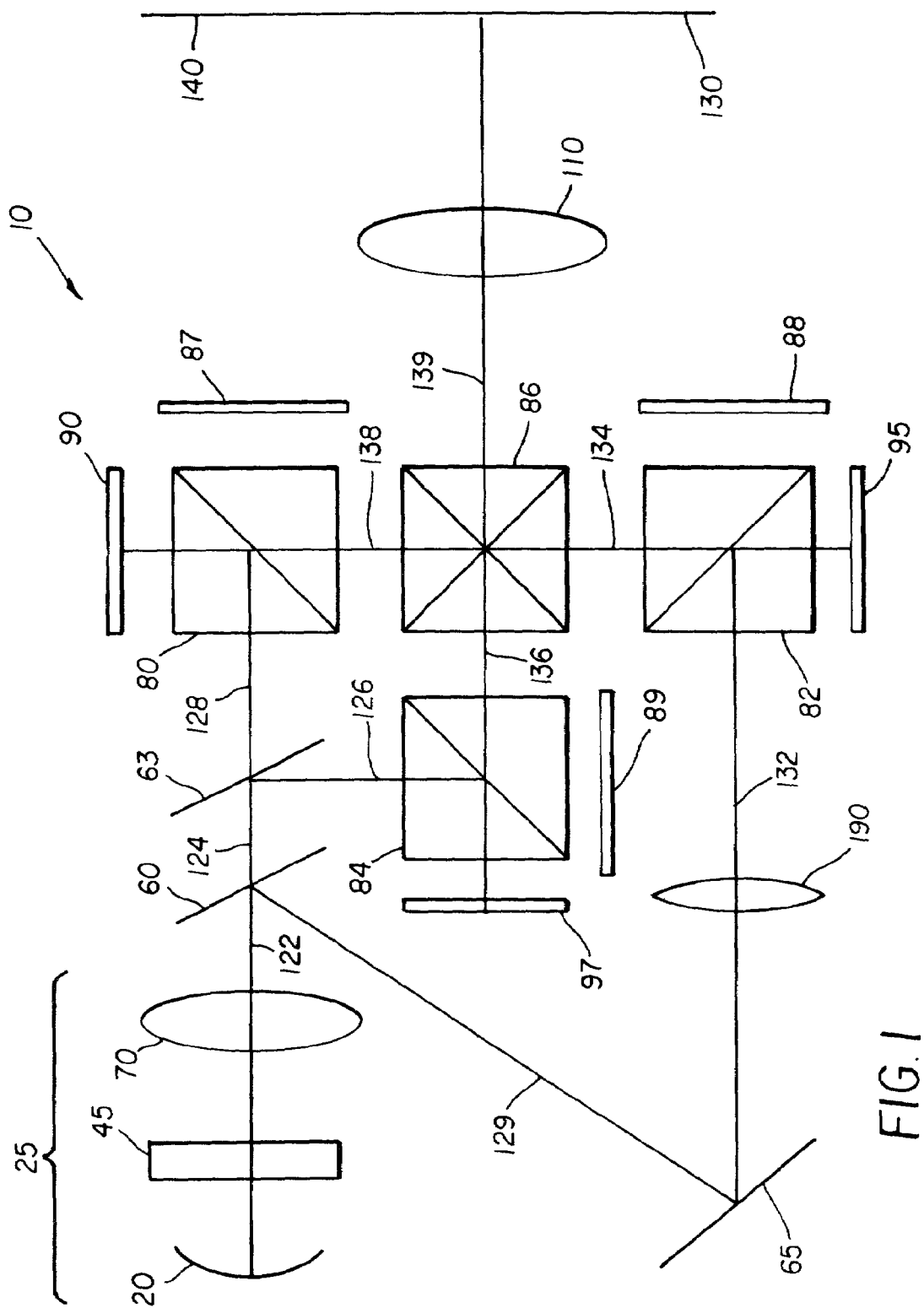
FIG. 1 is a schematic view of a reflective spatial light modulator based printing system using six reflective LCD modulators.

In FIG. 1, a printing apparatus 10 has a light source 20 which produces imaging light. The light is imaged through illumination system 25 containing a uniformizing optics assembly 45 to produce a uniformized light 122. A condenser lens 70 provides essentially telecentric illumination for modulation. Uniformized light 122 impinges on a beam-splitting element 60 which, in a color imaging system, may be a dichroic beamsplitter. A first color component 129 is reflected by a mirror 65 towards a first polarization beam-splitter 82. First polarizing beamsplitter 82 separates first color component 129 into a first polarization state and a second polarization state. A first spatial light modulator 95 is illuminated by the first polarization state of first color component 129 in a telecentric manner. A second spatial light modulator 88 is illuminated by the second polarization state of first color component 129. First spatial light modulator 95 is addressed with a first image data signal, and second spatial light modulator 88 is addressed with a second image data signal. Reflective spatial light modulators 88 and 95 each comprise a plurality of modulator sites in two dimensions. Upon being addressed with the first image data signal, first reflective spatial light modulator 95 modulates the first polarization state of first color component 129 on a site by site basis and reflects a first color modulated light 134 back through first polarization beamsplitter 82. Upon being addressed with the second image data signal, second reflective spatial light modulator 88 modulates first color component 129 having a second polarization state on a site by site basis and reflects the modulated light back through first polarization beamsplitter 82.

A second beamsplitting element 63 separates a second light component 124 to form a second color component 126. A second polarization beamsplitter 84 directs a first polarization of second color component 126 to a third spatial light modulator 97 in a telecentric manner. A fourth spatial light modulator 89 is illuminated by the second polarization state of second color component 126 in a telecentric manner.

Third spatial light modulator 97 is addressed with a third image data signal; fourth spatial light modulator 89 is addressed with a fourth image data signal. Reflective spatial light modulators 89 and 97 comprise a plurality of modulator sites in two dimensions. Upon being addressed with the third image data signal, third reflective spatial light modulator 97 modulates the incident light on a site by site basis and reflects the modulated light back through second polarization beamsplitter 84. Upon being addressed with the fourth image data signal, fourth reflective spatial light modulator 89 modulates the incident light on a site by site basis and reflects the modulated light back through second polarization beamsplitter 84.

A third polarization beamsplitter 80 separates a third light component 128 into a first polarization state and a second polarization state. A fifth spatial light modulator 90 is illuminated by the first polarization state of third light component 128 in a telecentric manner. A sixth spatial light modulator 87 is illuminated by the second polarization state of third light component 128 in a telecentric manner. Fifth spatial light modulator 90 is addressed with a fifth image data signal; sixth spatial light modulator 87 is addressed with a sixth image data signal. Reflective spatial light modulators 87 and 90 comprise a plurality of modulator sites in two dimensions. Upon being addressed with the fifth image data signal, fifth reflective spatial light modulator 90 modulates incident light on a site by site basis and reflects the modulated light back through the third polarization beamsplitter 80. Upon being addressed with the sixth image data signal, sixth reflective spatial light modulator 87 modulates incident light on a site by site basis and reflects the modulated light back through third polarization beamsplitter 80.

The modulated first, second, third, fourth, fifth, and sixth light beams, only beams 134, 136, and 138 are shown in FIG. 1, are directed through a combiner element 86, such as an X-cube, cross-prism, or dichroic prism, capable of combining the first, second, third, fourth, fifth, and sixth modulated light beams. For monochromatic light sources, dichroics are not used. For polychromatic systems, dichroics are quite useful. A print lens assembly 110 directs the combined light to a photosensitive media 140 at a media plane 130.

Figure 3:
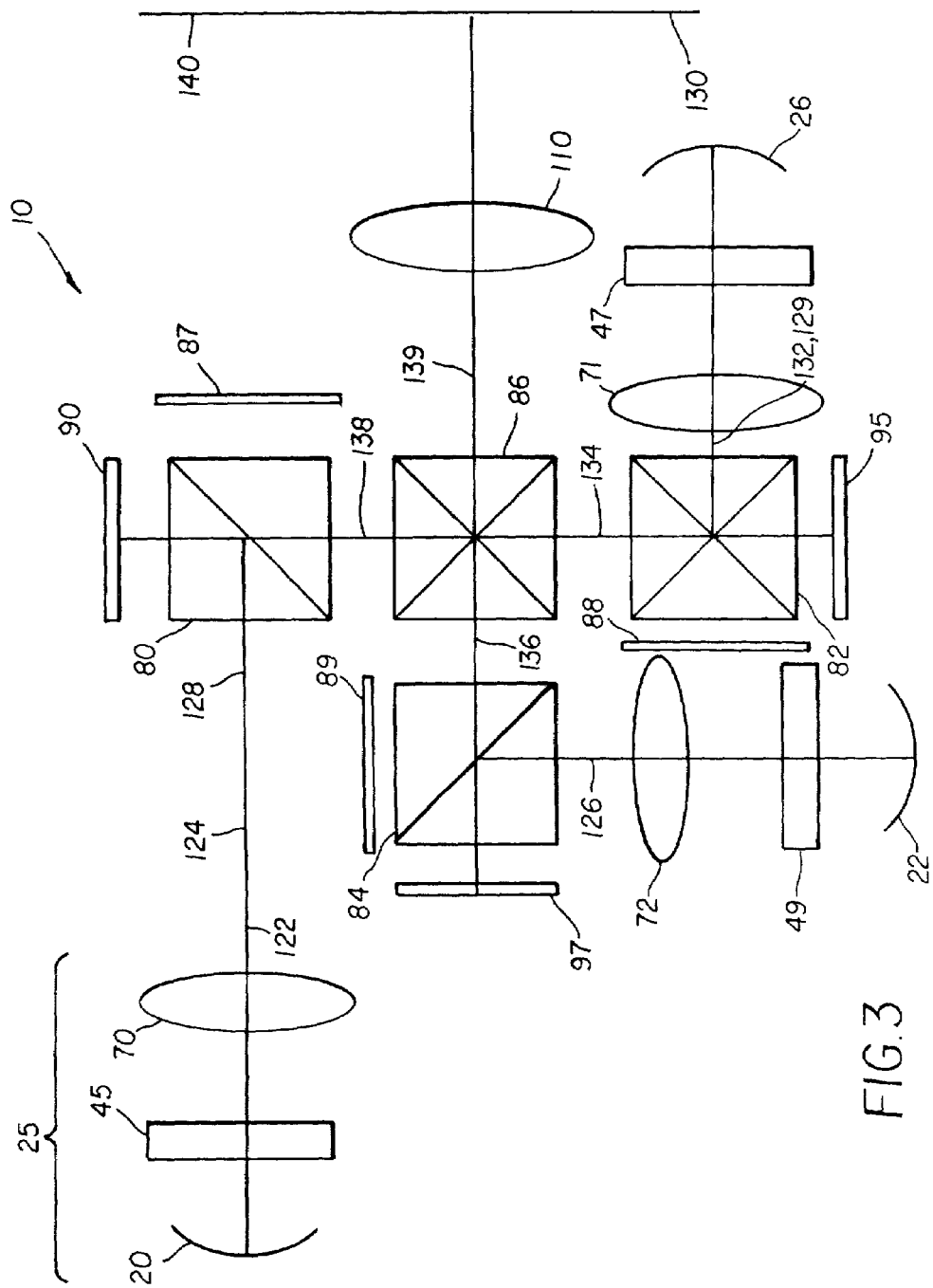
FIG. 3 is a schematic view of an alternate embodiment of a reflective spatial light modulator based printing system using six reflective LCD modulators and three independent light sources.

It should be noted that the specific positioning of a spatial light modulator 87, 88, 89, 90, 95, or 97 with respect to a polarization beamsplitter 80, 82, or 84, is a function of required extinction ratio from the beamsplitter and of the preferred mode of operation of combiner element 86. Depending on the specific polarization beamsplitter type and combiner, and on coatings employed by each device, the paired spatial light modulators 90 and 87, 95 and 88, or 97 and 89 may be disposed as shown in FIG. 3, on alternate facets of their respective polarization beamsplitters 80, 82, and 84, respectively.

In one aspect of the invention, a broadband light source is divided into red, green, and blue light components, perhaps through color filters or a color filter wheel. Red light is directed through the first polarizing beamsplitter.

Referring again to FIG. 1, in one aspect of the invention, a broadband light source is divided into red, green, and blue light components, possibly using color filters such as beamsplitters 60, 63, 65 or using a color filter wheel. Red light is directed through first dichroic beamsplitter element 60 and reflected from mirror 65 and illuminates first and second reflective spatial light modulators 95 and 88 in a telecentric manner. First and second reflective spatial light modulators 95 and 88 are addressed with image data for the red portion of a color image and first color component 129 is red light.

The red light is modulated by each spatial light modulator 95 and 88 and is reflected back through first polarization beamsplitter 82. Similarly, green light is directed through the second beamsplitting element 63 and illuminates third and fourth reflective spatial light modulators 97 and 89 in a telecentric manner. Third and fourth reflective spatial light modulators 97 and 89 are addressed with image data for the green portion of a color image. The green light is modulated by each spatial light modulator 97 and 89 and is reflected back through second polarization beamsplitter 84. Blue light is directed through third polarization beamsplitter 80 and illuminates fifth and sixth reflective spatial light modulators 90 and 87 in a telecentric manner. Fifth and sixth reflective spatial light modulators 90 and 87 are addressed with image data for the blue portion of a color image. The blue light is modulated by each modulator 90 and 87 and is reflected back through third polarization beamsplitter 80. The modulated red, green, and blue light beams are combined and directed through print lens assembly 110 to expose photosensitive media 140 at media plane 130.

Figure 2:
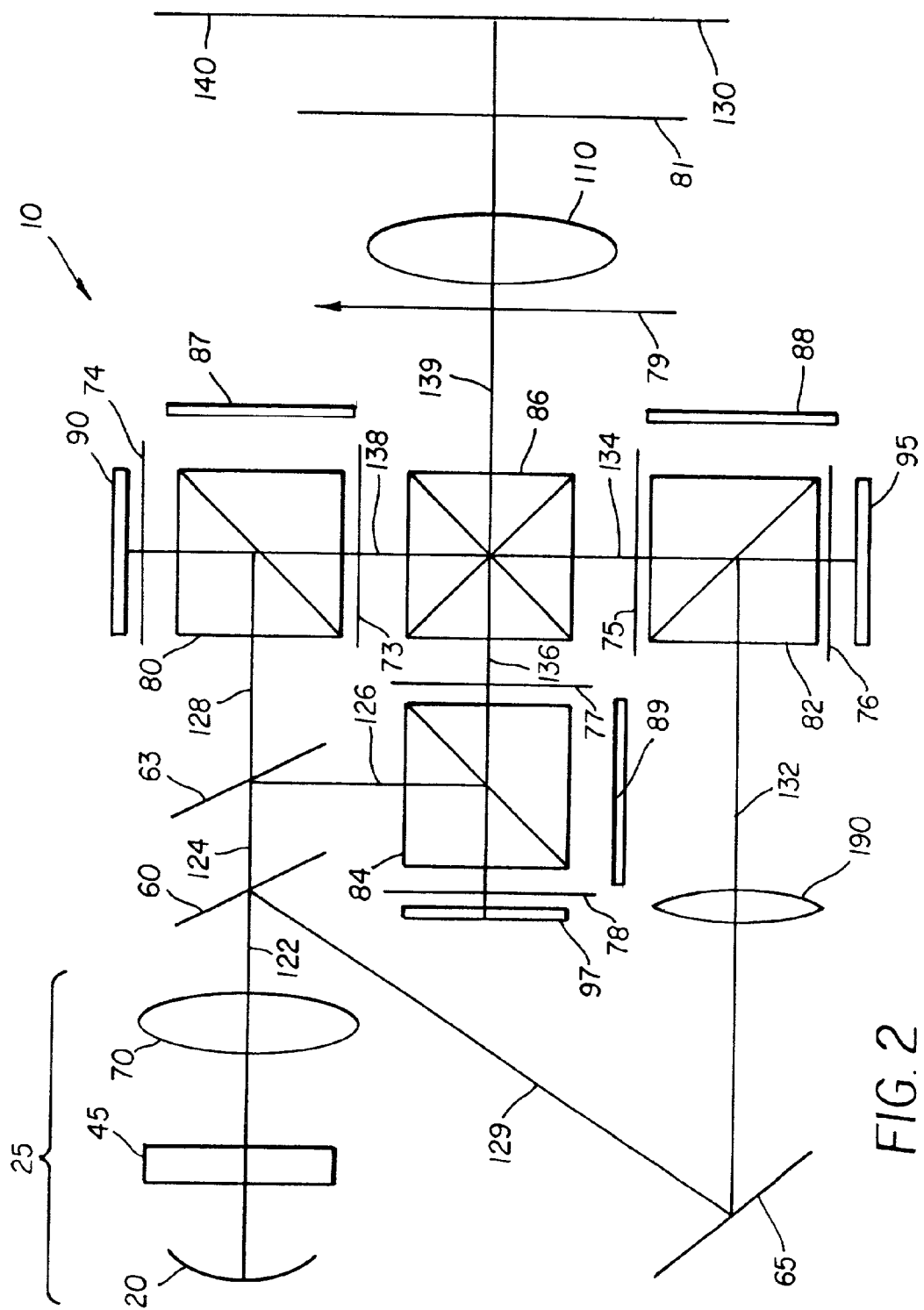
FIG. 2 is a schematic view of a reflective spatial light modulator based printing system using six reflective LCD modulators and three blur filters.

In FIG. 2, printing apparatus 10 has additional first, second, and third blur filter elements, 75, 77, and 73, respectively. Blur filters 75, 77, and 73 operate by providing multiple images of each pixel, where images can be positioned at an offset with respect to each other. In FIG. 2, the first and second modulated light components are passed through first blur filter element 75 to form a first blurred light component. The third and fourth modulated light components are passed through second blur filter 77 to form a second blurred light component. The fifth and sixth modulated light component is passed through third blur filter 73 to form a third blurred light component. The first, second, and third blurred light components are directed towards combiner element 86, which combines the components to form a complete image. The complete image is directed through print lens assembly 110 to expose photosensitive media 140.

The suggested locations for blur filter element 75, 77, and 73 placement are appropriate only if the blur filter is not itself polarization sensitive. If a polarization sensitive blur filter is employed, a single filter can be placed at a position 79 in FIG. 2. Alternately, a blur filter could also be positioned following print lens 110, at a position 81. It may also be advantageous to rotate a blur filter, thus moving the secondary spot formed by the filter, possibly as a function of time or of color.

Figure 10:
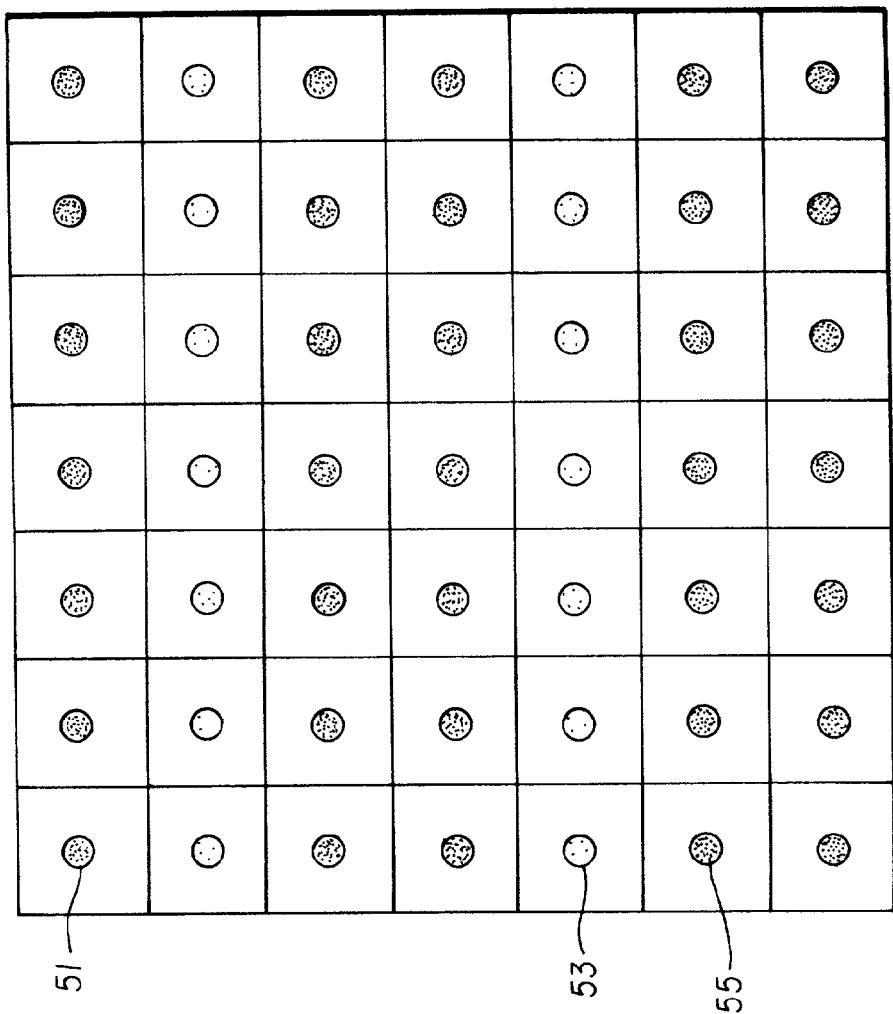
FIG. 10 is a plan view of an LED array followed by a lenslet array.

As an alternative embodiment, FIG. 3 is a schematic view of a reflective spatial light modulator-based printing system using six reflective LCD modulators and three independent light sources 20, 22, and 26. In a best mode printing system, light sources 20, 22, and 26 would be switchable between red, green, or blue primary colors. For example, each light source 20, 22, or 26 could be an array of red, green, and blue LEDs, possibly followed by a lenslet array, as shown in FIG. 10. In FIG. 10, the red LEDs 51, are followed by a row of green LEDs 53, and row of blue LEDs with a lenslet array 50 superimposed. Each light source 20, 22, or 26 could emit one of the primary colors (red, green, or blue), but could be switched such that each might emit only red light, for example. This allows the illumination of the printing system to be matched to the sensitivity characteristics of photosensitive media 140.

In FIG. 3, a first light source 20 directs a first wavelength of light towards uniformizing optics assembly 45 to produce uniformized first wavelength light as uniformized light 122. First light source 20 can be an array of LEDs, at least one laser, or a broadband light source with filters which allow the first wavelength of light to be transmitted. The uniformized first wavelength light, as uniformized light 122, is directed towards third polarization beamsplitter 80. Third polarization beamsplitter 80 divides the incident light into two different polarization states. One polarization state of light is directed towards fifth reflective spatial light modulator 90 to create an essentially telecentric illumination at fifth spatial light modulator 90. The second polarization state of light is directed towards sixth reflective spatial light modulator 87 to create an essentially telecentric illumination at sixth reflective spatial light modulator 87. Fifth spatial light modulator 90 is addressed by a first signal to create a first modulated light beam, which is passed back through the third polarization beamsplitter 80. Sixth reflective spatial light modulator 87 is addressed by a second signal to create a second modulated light beam, which is passed back through third polarization beamsplitter 80.

Referring again to FIG. 3, a second light source 22 directs a second wavelength of light towards a uniformizing optics assembly to produce second uniformized wavelength of light as second color component 126. Second light source 22 can be an array of LEDs, at least one laser, or a white light source with filters which only allow a second wavelength of light to pass. The uniformized second wavelength of light is directed towards a second polarization beamsplitter 84. Second polarization beamsplitter 84 divides the second wavelength of light into two different polarization states. One polarization state of the second wavelength light is directed towards third reflective spatial light modulator 97 to create a telecentric illumination at third spatial light modulator 97. The second polarization state of the second wavelength light is directed towards fourth reflective spatial light modulator 89 to create a telecentric illumination at fourth spatial light modulator 89. Third modulator 97 is addressed by a third signal to create a third modulated light beam, which is passed back through second polarization beamsplitter 84. Fourth modulator 89 is addressed by a fourth signal to create a fourth modulated light beam, which is passed back through second polarization beamsplitter 84.

A third light source 26 directs a third wavelength of light towards a uniformizing optics assembly to produce a uniformized third wavelength of light. The third illumination source can be an array of LEDs, at least one laser, or a broadband light source with filters which only allow the third wavelength of light to pass. The uniformized third wavelength of light is directed towards first polarization beamsplitter 82. First polarization beamsplitter 82 divides the third wavelength light into two different polarization states. One polarization state of third wavelength light is directed towards first reflective spatial light modulator 95 to create a telecentric illumination at first spatial light modulator 95. The second polarization state of third wavelength light is directed towards second reflective spatial light modulator 88 to create a telecentric illumination at second spatial light modulator 88. First modulator 95 is addressed by a first signal to create a first modulated light beam, which is passed back through first polarization beamsplitter 82. Second spatial light modulator 88 is addressed by a second signal to create a second modulated light beam, which is passed back through first polarization beamsplitter 82. The first, second, third, fourth, fifth, and sixth modulated light beams are directed towards combiner element 86 which combines the beams to form a complete image. The complete image is directed through print lens assembly 110 to expose photosensitive media 140.

Figure 4:
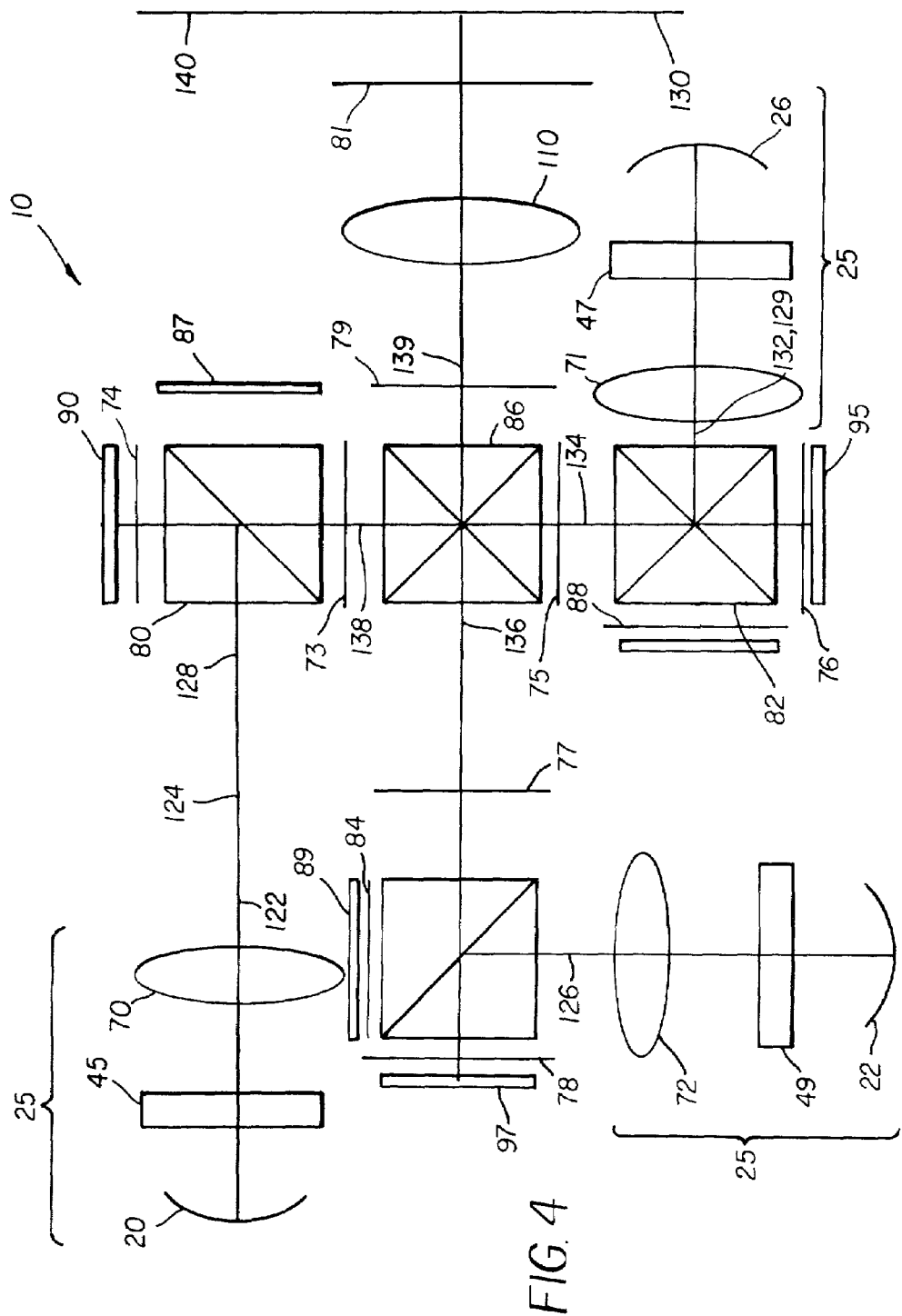
FIG. 4 is a schematic view of a reflective spatial light modulator based printing system using three independent light sources, six reflective LCD modulators, and three blur filters.

In FIG. 4, printing apparatus 10 has additional first, second, and third blur filter elements. The filters blur the image such that each individual modulator site would not be visible on exposed photosensitive media 140. In FIG. 4, the first and second modulated light components are passed through first blur filter element 75 to form a first blurred light component. The third and fourth modulated light components are passed through second blur filter element 77 to form a second blurred light component. The fifth and sixth modulated light components are passed through third blur filter element 73 to form a third blurred light component. The first, second, and third blurred light components are directed towards combiner element 86, which combines the components for form a complete image. The complete image is directed through a print lens assembly to expose photosensitive media 140.

Light sources 20, 22, and 26 of printing apparatus 10 in FIGS. 1–4 can be one or more lamps, one or more lasers, or a two-dimensional array of red, green, and blue LEDs. Light sources 20, 22, and 26 can be color or monochromatic. Types of light sources 20, 22, and 26 may include, but are not limited to: an array of monochromatic LEDs, one or more lasers, or a white light source with filters which only allow one color of light to pass. In the best mode of the printing system, the light source is switchable between monochromatic and polychromatic light. For example, if the illumination source contained an array of red, green, and blue LEDs, the red LEDs could be illuminated exclusively. This allows adjustment of characteristics of the light source, suited to the photosensitive media to be exposed. For example, a photosensitive media may be designed to be primarily sensitive to red light, while other types of photosensitive media may be designed to be sensitive to the visible light spectrum. If a monochromatic light source is used, a cross-prism may be used to divide the monochromatic light into three components, rather than separate the light into the primary red, green, and blue components.

The light source is mapped by uniformizing optics assembly 25 to cover the area of the reflective spatial light modulator. Uniformizing optics are designed to provide uniform and telecentric illumination to the modulator planes of the spatial light modulators. The design is unique to printing applications because, as is noted above, the requirements for uniformity of illumination and uniformity of image are far more stringent in printing than in projection display. The tolerance to roll-off at the edges of the illuminator is much greater in projection than in printing. The telecentricity is required to maintain the uniformity of the image at the image plane because of constraints on spatial light modulator operation. This aspect of the invention sets it apart from systems generally used for projection display. If the light impinging is not telecentric, then modulation across the different angles of incident light is not uniform which will lead to a severe degradation in contrast.

In a color printing system, where first, second, and third light sources 20, 22, and 26 may be red, green, or blue light, the printer can include color and polarization controlling filters for the enhancement and control of color and contrast. These filters may include a polarizer placed in the illumination path between the lamp and the polarizing beamsplitter cube and/or a polarizer placed between the polarizing cube and the print lens for additional polarization control and for contrast enhancement. Filters can also be placed between the reflective LCD modulators and the prism assembly.

First, second, and third polarization beamsplitters 82, 84, and 80 of FIGS. 1–6, referred to in general for the purposes of this application as an optics assembly, may be replaced by other components. For example, the optics assembly may comprise a pellicle or a wire grid polarizer.

In FIGS. 1–4, first spatial light modulator 95 is located on a portion of a first facet of first polarization beamsplitter 82. Second spatial light modulator 88 is located on a portion of a second facet of first polarization beamsplitter 82. Third spatial light modulator 97 is located on a portion of a first facet of second polarization beamsplitter 84, and fourth spatial light modulator 89 is located on a portion of a second facet of second polarization beamsplitter 84. Fifth spatial light modulator 90 is located on a portion of a first facet of third polarization beamsplitter 80, and sixth spatial light modulator 87 is located on a portion of a second facet of third polarization beamsplitter 80.

Each polarization beamsplitter has such characteristics as to reflect the s-polarized light component but transmit the p-polarized light component. However, each polarization beamsplitter may have reversed characteristics.

The light incident upon the reflective spatial modulators must be linearly polarized, but light reflected having the same polarization is to be excluded from the image forming beam. Application of a voltage to the reflective spatial light modulators causes a rotation of polarization. The light of polarization rotated relative to the incident beam is selected for forming the image upon the image plane. This is achieved by use of the polarization beamsplitter cube designed for use over a wide range of wavelengths of the visible light spectrum and over a suitable range of angular divergence of the beam, typically a number of degrees.

Because polarization beamsplitter elements may not provide adequate extinction between s-polarization state of light (not shown) and p-polarization state of light (not shown), an optical linear polarizer may be incorporated prior to each polarization beamsplitter element. Linear polarizers can be used to isolate the polarization state parallel to the axis of each polarization beamsplitter element. This serves to reinforce the polarization state determined by each polarization beamsplitter element, decrease leakage light and thereby increase the resulting contrast ratio. Light of the s-polarization state passing through each polarization beamsplitter element is directed to the plane of a respective spatial light modulator, which are reflective LCDs in the preferred embodiment. The p-polarization state is passed through polarization beamsplitter elements.

Figure 5:
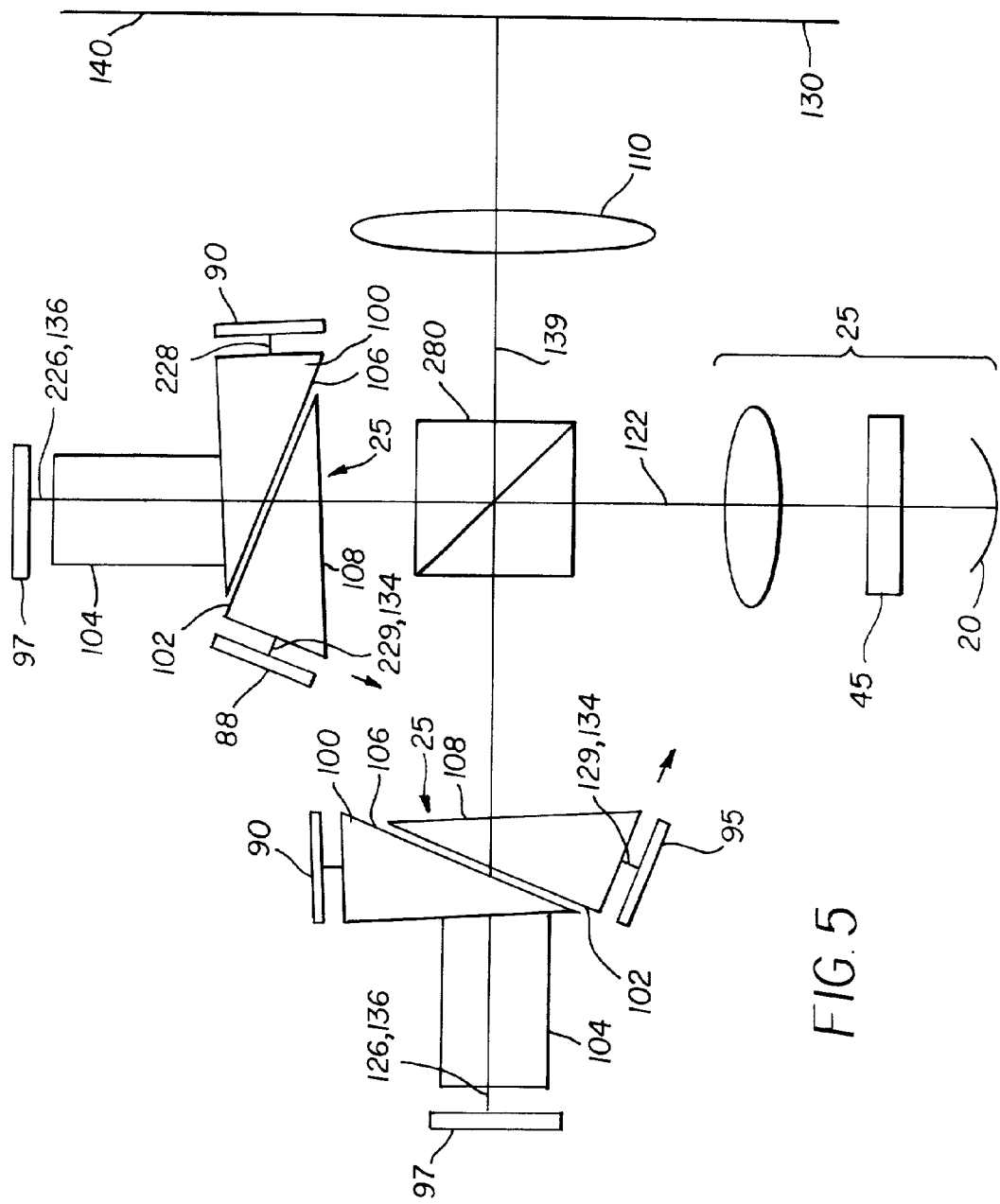
FIG. 5 is a schematic view of an alternate embodiment of a reflective spatial light modulator-based printing system using six reflective LCD modulators and six prisms.

Referring to FIG. 5, there is shown a schematic view of an alternate embodiment of a reflective spatial light modulator-based printing system using six reflective LCD modulators and six prisms. For the arrangement of FIG. 5, light source 20 and uniformizing optics 25 provide uniformized light 122 to polarization beamsplitter 280. Two similar assemblies are provided for light modulation, one for each polarization state of uniformized light 122 as separated by a polarization beamsplitter 280. The operation of one of these assemblies is described in detail; the other assembly works in similar fashion. A first prism 100 has an internal reflection surface 106. A second prism 108 has an internal reflection surface 102. First and second prisms 100 and 108 separate the incident light into a first light component 228, a second light component 229, and a third light component 226. Third light component 226 is directed through a third prism 104 to third spatial light modulator 97. Similarly, second light component 229 is directed to second spatial light modulator 88. First light component 228 is directed through first prism 100 to first spatial light modulator 290.

With the angular displacement of prisms 100, 104, and 108 shown in FIG. 5, and with appropriate dichroic coatings, the prisms provide the necessary separation of light components for modulation. In addition, each prism 100, 104, and 108 recombines modulated light reflected from each of the corresponding spatial light modulators 290, 88, and 97. In the preferred embodiment, prisms 100, 104, and 108 cooperate to divide broadband incident light into red, green, and blue (RGB) light components. Each light component is then directed to a specific spatial light modulator 290, 88, or 97 in a telecentric manner. The resulting modulated red, green, and blue light beams are combined in polarization beamsplitter 280 and directed toward print lens assembly 110 for writing onto photosensitive media 140. The arrangement of FIG. 5 allows multiple RGB channels, or any arrangement of single-color or multiple-color channels of modulated image data for printing.

Figure 6:
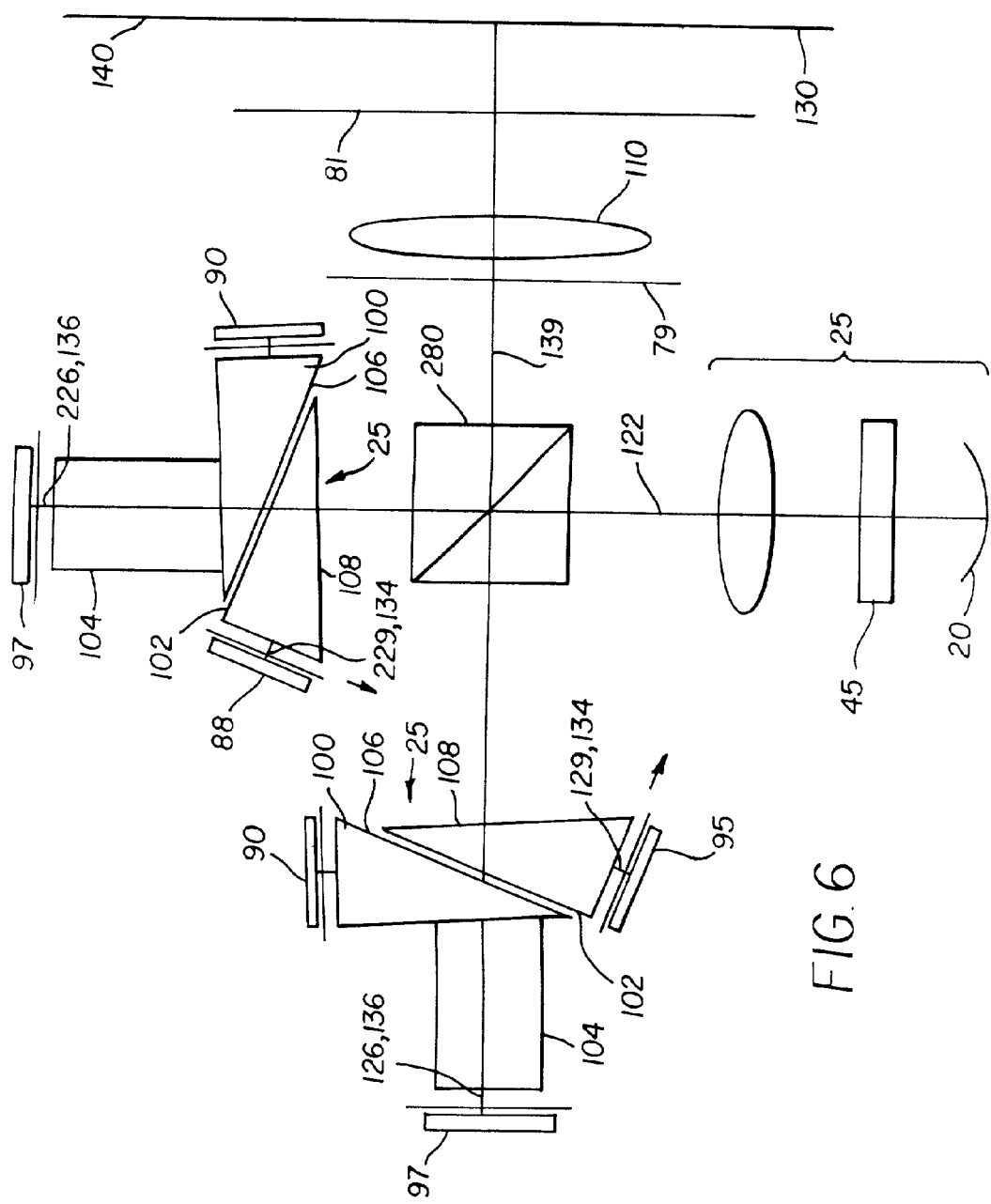
FIG. 6 is a schematic view of an alternate embodiment of a reflective spatial light modulator-based printing system using six reflective LCD modulators and six prisms with six blur filters.

FIG. 6 is a schematic view of an alternate embodiment of a reflective spatial light modulator-based printing system using six reflective LCD modulators and six prisms with the same basic arrangement as shown in FIG. 5 with six blur filters added, one in position ahead of each spatial light modulator. As described above, blur filters operate to blur the modulated image light so that individual modulator sites are indistinguishable from their neighboring sites on exposed photosensitive media 140.

The alternative arrangements of FIGS. 5 and 6 may use any of a number of types of light sources, as enumerated above. The arrangement of FIGS. 5 and 6 allows optimization of light source type for the photosensitive media 140 selected. Uniformizing optics and telecentricity requirements noted above for FIGS. 1–4 also apply in general to the configurations of FIGS. 5 and 6.

It must be noted that positions of beamsplitter components and their coatings determine the precise polarization states directed and transmitted by these components. Different placement or coatings may result in different polarization states at different parts of the optical systems described above.

Figure 7A:
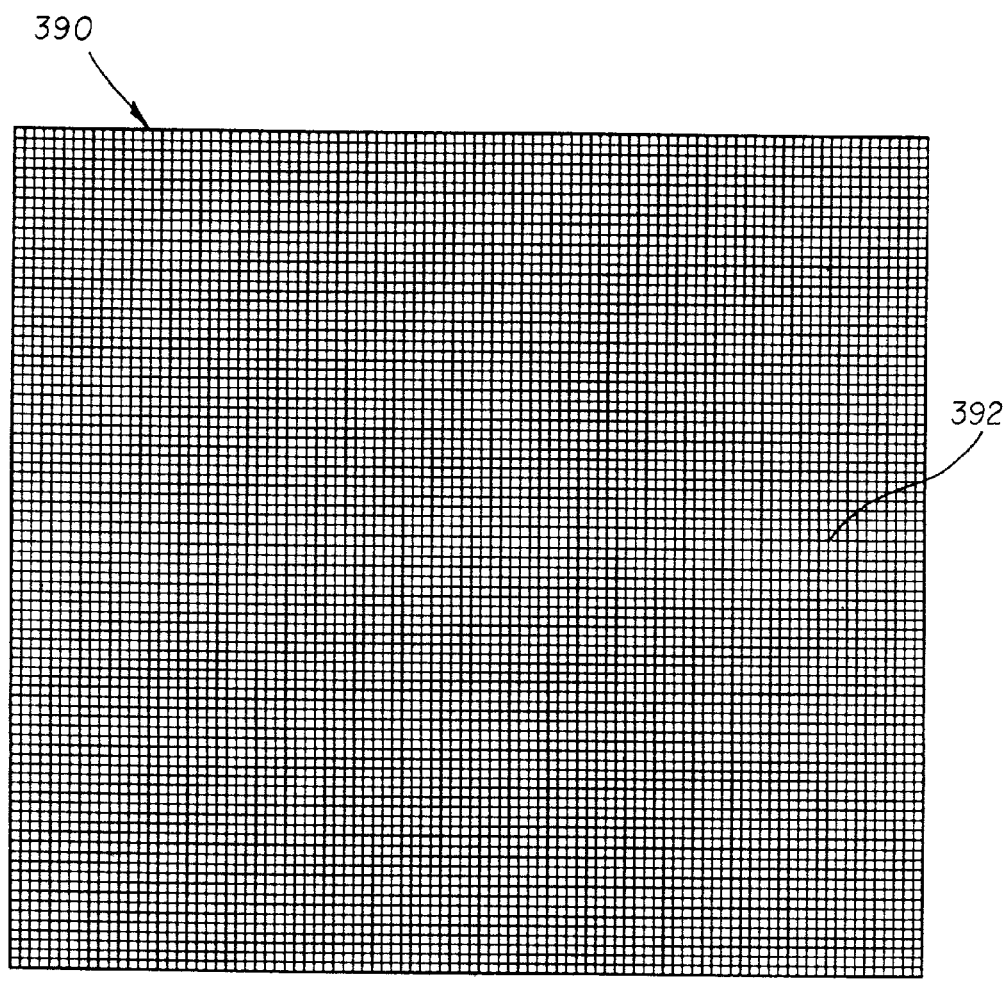
FIGS. 7a and 7b are a top plan view and a side view in cross section, respectively, of a reflective LCD modulator.
Figure 7B:
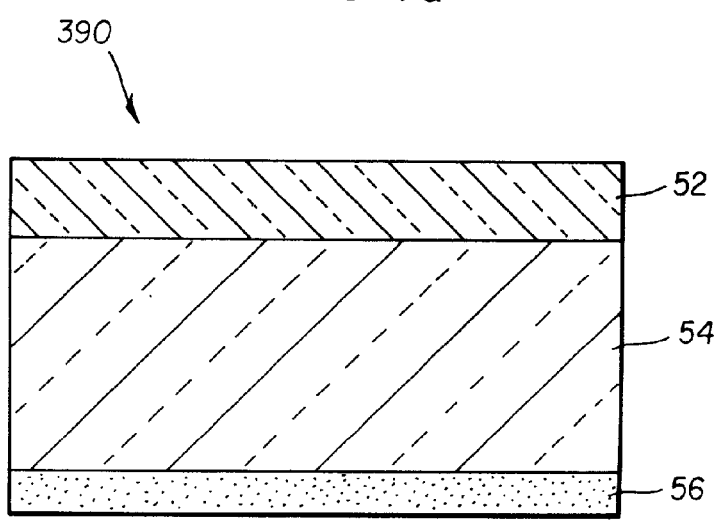

FIGS. 7a and 7b show a top view and a side view respectively of a reflective LCD modulator 390 as used in the present invention. The reflective LCD modulator consists of a plurality of modulator sites 392. Each modulator site 392 is individually modulatable. Referring to FIG. 7b, light passes through a top surface 52, a liquid crystal material 54, is reflected off a back plane 56 of modulator 390, and returns through modulator 390. If modulator site 392 is "on" or bright, during the round-trip through reflective LCD modulator 390, the polarization state of the light is rotated. In an ideal case the polarization state of the light is rotated 90 degrees. However, this degree of rotation is rarely easily achieved. If a given modulator site 392 is "off" or dark, the polarization state of the light is not rotated. The light that is not modulated is not passed straight through the polarized beamsplitter but is redirected away from the photosensitive media 140 plane by the polarized beamsplitter. It should be noted that the polarization state of the light that is rotated by reflective LCD modulator 390 may become elliptically polarized, however, upon passing through a linear polarizer, the light will regain a linearly polarized state.

The most readily available choice for reflective polarization based spatial light modulators is the reflective LCD modulator. Such modulators, originally developed for use in projection display, can have resolutions as high as 4000×2000 modulator sites. Currently, resolutions of 1900×1200 are available with footprints as small as 0.78 inches diagonal. These high resolution reflective LCD modulators are often twisted nematic LCDs or homeotropically aligned reflective LCD modulators. Other types of reflective LCD modulators, such as ferroelectric modulators, are often employed in projection display. Some of the key characteristics of these LCDs are: high resolution; high contrast (>100:1) in all three primary colors; a fast frame rate of 70 frames per second or higher, and high aperture ratio, i.e. greater than 90%. In addition, the incorporation of a CMOS backplane increases the uniformity across the array. The LCDs are also capable of producing an eight bit grayscale either through pulse width modulation or through analog operation. In either case data may be introduced digitally to the printing system. These characteristics ensure that the reflective LCD modulator is an excellent choice for use in a reflective printing system.

The reflective LCD modulator printing system can be designed in a number of different configurations. A low cost system utilizing six reflective LCD modulators can provide greater throughput of high resolution prints than a single reflective LCD system, while still avoiding reciprocity failure problems. An LCD modulator may be either specifically designed for color sequential use, often incorporating a faster backplane and slightly different liquid crystal compositions, or it can be a single chip with a 60 to 70 frames per second backplane. The latter option is sufficient for printing because the high frame rates are not a necessity and often reduce the bit depth of the resulting image. However, while many liquid crystals are the same basic crystal for all three primary color wavelengths, sometimes, either due to the specific applied voltage or the liquid crystal thickness, operation may differ in the three wavelengths. Specifically, for a given liquid crystal composition, depth, and applied voltage, the resulting polarization rotation on an incident beam may vary with wavelength. The efficiency and contrast of the modulation will vary among the three colors. This optical system is designed to image and pass light with a rotated polarization state. However, the degree of rotation will vary as a function of wavelength. In the bright, or "on" state, this difference in rotation will affect the efficiency of the system. In other words, the percentage of incident light that is actually modulated and imaged on the media plane will vary. This difference in wavelength efficiency can be accounted for by varying the illumination strength, and exposure time. Also, the media requires different power densities in the different wavelengths. More significant problems arise in the dark or "off state." In this state, the polarization state of the light is not rotated and should not be directed thought the polarizing beamsplitter and imaged. If the polarization state of the light is in fact rotated, light will leak through the imaging system and decrease the contrast.

The reflective spatial light modulators contained in the printing system can be selected such that each modulator advantageously handles a particular primary color of light. For instance, one modulator would be more effective at modulating red light, while another modulator would be more effective at modulating green light, and the third modulator would be more effective at modulating blue light. However, if the printing system is constructed such that it is necessary to switch from monochromatic to polychromatic light, it would be desirable to have multiple spatial light modulators having an essentially equal response to visible light. If the media is more strongly sensitive in one color than another, it may be advantageous to use four or five modulators instead of six. For instance, two red modulators may be used while only one in the blue or green channel. Architecturally all that would be required would be to delete or turn off one modulator in the blue and/or green channel.

In systems that utilize more than one reflective LCD modulator, each of the reflective LCD modulators is distinct, and the activation voltage may differ between any two modulators. Ideally, the behavior of multiple reflective LCD modulators is identical, but processing differences may necessitate tuning the modulators independently. Additionally, because polarization rotation is not perfect at the modulator, care must be taken in the addressing scheme to allow adequate modulation at each device.

Print lens assembly 110 may either magnify or demagnify the complete color image. For example, demagnification is necessary when photosensitive media 140 is photographic film, which may range in widths from 16 mm to 70 mm. Magnification is necessary when photosensitive media 140 is photographic paper. In the best mode of the invention, print lens assembly 110 would be switchable on command between providing magnification or demagnification relating to a given image size at the image plane. Thus, it is possible for printing apparatus 10 to create images corresponding to different print sizes. Ideally, the illumination and modulator assemblies remain unaltered and a different arrangement of print lens assembly 110 is partitioned.

Because printing is not a real time application, features and methods designed to enhance system operation are available that would not be possible in a real time, or direct viewing application.

Specifically, time consuming features such as dithering can be employed. Additionally, color balancing and image quality becomes a property of the imaging system in conjunction with the media on which the image is viewed. It is the composite image that is viewed, so the proportion and intensity of light imaged, is determined by the media. What would be considered a good image in a direct view projector is unacceptable in a print. Similarly, a good printed image may be unsuitable for projection.

Composite Image

Creating a balanced composite image comprised of several images provides many challenges both in grayscale generation as well in elimination of artifacts. When multiple spatial light modulators such as LCDs are employed, each LCD transmission and grayscale profile must be mapped. The image data transmitted to each LCD must reflect the characteristics of that device, and for the illumination of the system. For example, referring back to FIG. 1, first spatial light modulator 95 may have higher transmission characteristics than the second or third spatial light modulators 88 or 97. The corresponding image data sent to first spatial light modulator 95 must reflect the discrepancy and balance it out. There are several ways to balance such a discrepancy. First, each device can be loaded with its own electro-optic response curve. The top surface of LCD and backplane of LCD voltages can be set independently. The code values can be mapped differently to the two devices. For example, code value 200 for first spatial light modulator 95 may actually be a shorter pulse duration in a pulse width scheme or a lower drive voltage in analog scheme than code 200 for second spatial light modulator 88. If second spatial light modulator 88 does not have an equal transmission characteristic to first spatial light modulator 95, or the net light level reaching or departing second spatial light modulator 88 is lower than that of first spatial light modulator 95, such correction in voltage would be required. Each device will require its own grayscale calibration. It is possible for devices that are mapping 14–16 bit tables to an 8 bit device, and then the same driver board may be employed, with different mappings of the two devices. In the case of interwoven images, this balancing is the primary adjustment.

Nonuniformity

A digital printing system must also correct non-uniformities in an image. Referring back to FIG. 7a, the exposure system can correct for some non-uniformities such as roll-off at modulator 390 edges. One way to accomplish this is to introduce additional image data to modulator 390 activating only modulator sites 392 at edges. These images are exposed and superimposed on the other images thus giving additional depth to the edge regions. For example, a series of images taken at six reflective LCD modulators could be scanned, data maps created, and all input data with initial maps of the six reflective LCD modulators combined to correct the image. Similar techniques can be used to adjust for modulator non-uniformities that are known prior to operation.

Artifacts

A digital printing system must also be concerned with image quality and the presence of artifacts. In the case of juxtaposition of images, the image data needs to reflect the grayscale, the device uniformity, and the regions of overlap need to be balanced with the non-overlapped regions of the image.

In digital printing systems utilizing multiple LCDs, the grayscale in the region of overlapped or interwoven images needs to be established as a function of multiple devices. This may require a different electro-optic curve for that region or simply a different mapping of code values. Such an algorithm may require use of multiple exposures to isolate overlap data from non-overlap data. If this is not possible the image data should be adjusted or offset such that the composite image produces the same grayscale as non-overlapped regions.

Dithering

Dithering may be used to increase the inherent LCD resolution and to compensate for modulator site 392 defects. A dithering pattern for a standard high aperture ratio reflective spatial light modulator is shown in FIGS. 8a–8d.

To dither a full aperture reflective spatial light modulator is to image the spatial light modulator at one position, and reposition the reflective spatial light modulator a fraction of a modulator site distance away and image. In so doing, multiple copies of the same images are created and overlapped. By overlapping multiple images, the system acquires a redundancy that corrects for modulator site failure or drop out. Furthermore, interpolating or updating the data between positions increases the effective resolution.

Figure 8B:
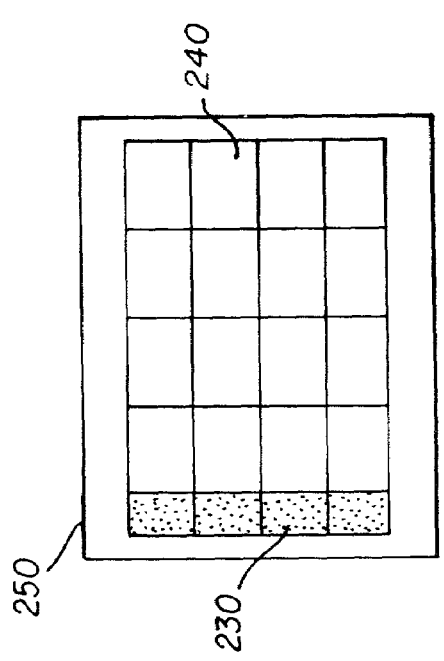
FIGS. 8a–8d illustrate the effect of dithering an un-apertured spatial light modulator using four distinct image positions.
Figure 8D:
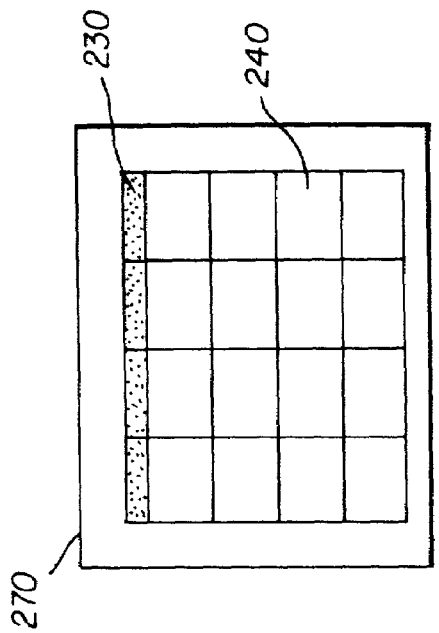
Figure 8A:
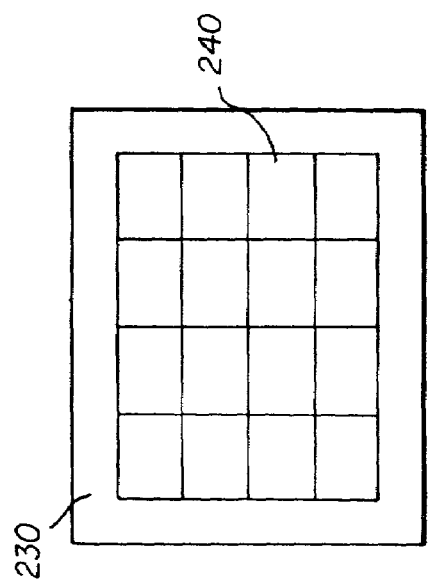
Figure 8C:
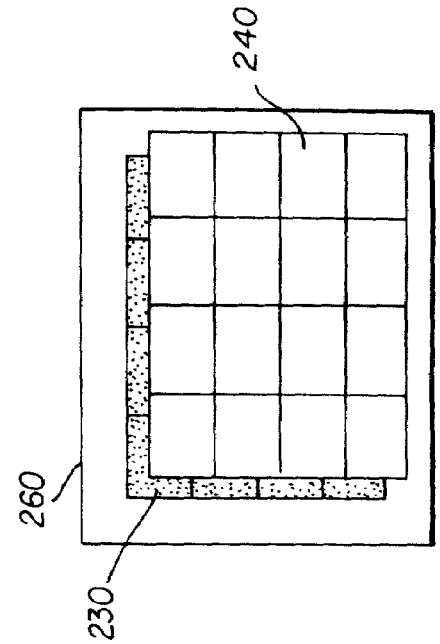

Referring to the example dithering scheme depicted in FIGS. 8a–8d, the reflective spatial light modulator 230 is first positioned at a first modulator position 240 and modulator sites are imaged (FIG. 8a). Reflective spatial light modulator 230 is then imaged at a second modulator position 250. Reflective spatial light modulator 230 is then displaced one-half modulator site longitudinally from previous second modulator position 250, which means it is diagonally displaced from initial first modulator position 240 to a third modulator position 260 (FIG. 8d). Modulator sites 230, 250, and 260 are illuminated and the media exposed again. Reflective spatial light modulator 230 is then moved to a fourth modulator position 270 that is laterally displaced from third modulator position 260 (FIG. 8c). Photosensitive media 140 is then exposed at this position.

Using this pattern, there is effectively a fourfold increase in the amount of data written. This serves to increase image resolution and provide means to further sharpen images. Alternately, with a high aperture ratio, it may be sufficient to simply dither in one diagonal direction. For example, from first modulator position 240 shown in FIG. 8a to third position modulator 260 shown in FIG. 8c in order to achieve suitable results.

Dithering requires motion of the modulator in two directions. Each increment of motion is approximately between 5 $\mu$m and 20 $\mu$m for a typical reflective LCD modulator. In order to achieve this incremental motion, many different actuator or motion assemblies can be employed. For example, the assembly can use two piezo-electric actuators per modulator.

In an alternate embodiment for dithering, requiring minimum modification to a reflective LCD device designed for projection display, the device can be sub-apertured. In an effort to markedly increase resolution, the modulator can contain an aperture ratio that is relatively small. Ideally this aperture must be symmetrically placed within each modulator site 392 (FIG. 7a). The result is modulator site 392 for which only a fraction of the area transmits light.

Printing apparatus 10 is capable of achieving sufficient uniformity while retaining the grayscale performance. The reflective spatial light modulators alone can receive up to 8 bits of bit depth. However, 8 bits to the modulator may not translate to 8 bits at the media. Furthermore, LCD modulators are known to exhibit some measure of roll-off or loss of contrast at the edges of the device. To print an adequate grayscale range and provide additional bit depth, it is possible to create a single image at the photosensitive media as a super-position of a series of images. The individual images that comprise the final image can vary both in information content and illumination.

It is possible to maintain the same image data at the reflective spatial light modulators and, by altering the illumination level from at least one light source, introduce additional bit depth. By varying the illumination level, (and/or duration), and by altering the data content controlling spatial light modulator, the printing apparatus can form a composite image out of a series of preliminary images. The superposition of the images of varied information content and varied illumination level introduces additional bit depth to the composite image.

If dithering is employed grayscale generation, uniformity correction, and artifact reduction should be mapped as a function of the dither. Because of the digital addressability of the reflective LCD modulator and the pulsed LED method of illumination, this approach to printing provides an adequate bit depth and reasonable timing for use in a photographic printer.

In order to create a high resolution and reduce the additional time associated with dithering, pairs of spatial light modulators may be used to dither. For example, one spatial light modulator may dither an image in the x-direction, while another dithers the same image in the y-direction. Similarly, offset LCDs may dither along an axis perpendicular to the offset. The illumination light for each modulator can be of equal intensity, and the image data for each modulator can be the same. In a color printing system two LCDs would modulate and dither the red light portion of a complete image in the x- and y-direction, two other LCDs would modulate and dither the green light portion of a complete image in the x- and y-direction, and an additional two LCDs would modulate and dither the blue light portion of a complete image in the x- and y-direction. Rapid printing of high resolution images may also be achieved by offsetting the position of a pair of reflective spatial light modulators. For instance, the resolution of the image printed onto a photosensitive media is increased when a first spatial light modulator is diagonally offset from a second spatial light modulator; a third spatial light modulator is diagonally offset from a fourth spatial light modulator; a fifth spatial light modulator is diagonally offset from a sixth spatial light modulator.

The bit depth of the image printed onto a photosensitive media can also increase by providing different amount of illumination to a pair of reflective spatial light modulators. For example, a pair of spatial light modulators, each addressed with the different image data, can be illuminated with different intensity levels of light. These modulators may also be dithered in the x- and y-directions. In a color printing system, two LCDs would modulate and dither differing intensities of red light to form the red portion of a complete image, two other LCDs would modulate and dither differing intensities of green light to form the green portion of a complete image, and an additional two LCDs would modulate and dither differing intensities of blue light to form the blue portion of a complete image.

Temperature Control

Figure 9:
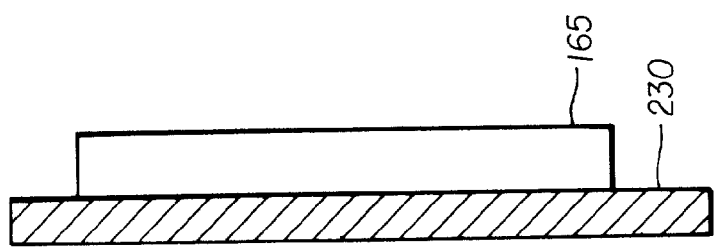
FIG. 9 shows a spatial light modulator with a temperature control device located behind it.

When utilizing a spatial light modulator, care must be taken to ensure the proper operating conditions for the modulator. Many modulators and LCDs are sensitive to variations in temperature. In a printing system, a 10° C. shift in temperature, can lead to a 10 code value, or 3% reflectance shift in operation. When faced with temperature variations, there are two alternatives. One alternative is to recalibrate to account for changes. This maybe accomplished at a given time or temperature interval. The other alternative is to hold the temperature constant. Referring to FIG. 9, the temperature of reflective spatial light modulator 230 can be controlled by a temperature transducer 165 for either cooling or heating the device. For example, a thermoelectric cooler may be mounted as temperature controller on the back of the device. Alternatively, a heater may be placed on the device. Reflective LCDs often operate faster, and more efficiently when warm. So, heating the device to a given temperature, and holding the temperature is a solution to thermal drift problems.

When heating or cooling the device, it is important to do so in a manner that does not introduce either stress or uneven thermal patterns to the device. In either case, variations in the operating condition of the device lead to image non-uniformities and calibration differences. Aside from immediate issues with stress and temperature gradients, care must be taken to ensure that as the temperature of the surroundings and device change, that the thermal control methods do not expand and contract in manner that creates stress variations to the device. It is sometimes preferable to use a heater than a thermo-electric cooler to control the temperature of the device. It may also be necessary to defect correct or uniformity correct image data as a function of temperature.

Intermediate Image Data

When printing, there is a time between prints when the media is repositioned. Also, when printing color sequentially, there is a brief time between colors. It is advantageous to use these intermediate times to remove any residual images from the modulator. This can be accomplished in a variety of different ways. The modulator and/or the corresponding light source may be turned to an off or low state in the intermediate time. Alternatively, the modulator can be turned to a fully charged state, while the light source is off or shuttered off. This mode would allow use of the faster switching time associated with charging a capacitor. The modulator may be charged to any intermediate level.

In a more complicated method of operation, the device may be loaded with data specific to prior or future image content to provide best operation.

Additionally, if the system is used in a color sequential manner, the backplane voltages may need to vary as a function of color. The intermediate time is a good time to switch voltages such that the changes will settle out before the following image is refreshed in the device.

Reduced Number of Modulators

It should be understood that the same system can be employed with 4 or 5 modulators. For instance, when a system is demanding in 1 color, that color branch would employ 2 devices while the other channels 1 device each. Alternatively, two channels may require 2 devices while one channel uses only one. The optical architecture remains unchanged.

The invention has been described in detail with particular reference to certain preferred embodiments thereof, but it will be understood that variations and modifications can be effected within the scope of the invention.

PARTS LIST

10. Printing apparatus
20. Light source
22. Light source
26. Light source
25. Illumination optics
45. Optics assembly
50. Lenslet array
51. Red LED
52. Top surface
53. Green LED
54. Liquid crystal material
55. Blue LED
56. Back plane
60. First beamsplitting element
63. Second beamsplitting element
65. Mirror
70. Condenser lens
73. Third blur filter element
75. First blur filter element
77. Second blur filter element
79. Position
80. Third polarization beamsplitter
81. Position
82. First polarization beamsplitter
84. Second polarization beamsplitter
86. Combiner element (recombiner element, cross prism, x-cube)
87. Sixth spatial light modulator
88. Second spatial light modulator
89. Fourth spatial light modulator
90. Fifth spatial light modulator
95. First spatial light modulator
97. Third spatial light modulator
100. First prism
102. Internal reflection surface
104. Third prism
106. Internal reflection surface
108. Second prism
110. Print lens assembly
122. Uniformized light
124. Second light component
126. Second color component
128. Third light component 129. First color component
130. Media plane
134. First color modulated light
136. Beam
138. Beam
140. Photosensitive media
165. Temperature transducer
226. Third light component
228. First light component
229. Second light component
230. Reflective spatial light modulator
240. First modulator position
250. Second modulator position
260. Third modulator position
270. Fourth modulator position
280. Polarization beamsplitter
290. First spatial light modulator
390. Reflective LCD modulator
392. Modulator site

What is claimed is:

1. A method of printing an image onto a photosensitive media comprising the steps of:

imaging light from a light source through a uniformizing optics assembly to form uniformized imaging light;

separating said uniformized imaging light into a first light component, a second light component and a third light component;

passing said first light component through a first polarization beamsplitter element to produce a first polarization state of said first light component and a second polarization state of said first light component;

passing said first polarized first light component to a first spatial light modulator to create a telecentric illumination at said first spatial light modulator;

passing said second polarized first light component to a second spatial light modulator to create a telecentric illumination at said second spatial light modulator;

addressing said first spatial light modulator with a first signal to create a first modulated light beam and said second spatial light modulator with a second signal to create a second modulated light beam;

passing said first modulated light beam and said second modulated light beam through said first polarized beamsplitting element;

passing said second light component through a second polarization beamsplitter element to produce a first polarization state of said second light component and a second polarization state of said second light component;

passing said first polarized second light component to a third spatial light modulator to create a telecentric illumination at said third spatial light modulator;

passing said second polarized second light component to a fourth spatial light modulator to create a telecentric illumination at said fourth spatial light modulator;

addressing said third spatial light modulator with a third signal to create a third modulated light beam and addressing said fourth spatial light modulator with a fourth signal to create a fourth modulated light beam;

passing said third modulated light beam and said fourth modulated light beam through said second polarized beamsplitting element;

passing said third light component through a third polarization beamsplitter element to produce a first polarization state of said third light component and a second polarization state of said third light component;

passing said first polarized third light component to a fifth spatial light modulator to create a telecentric illumination at said fifth spatial light modulator;

passing said second polarized third light component to a sixth spatial light modulator to create a telecentric illumination at said sixth spatial light modulator;

addressing said fifth spatial light modulator with a fifth signal to create a fifth modulated light beam and addressing said sixth spatial light modulator with a sixth signal to create a sixth modulated light beam;

passing said fifth modulated light beam and said sixth modulated light beam through said third polarized beamsplitting element;

directing said first, second, third, fourth, fifth, and sixth modulated light beams toward a combiner element;

combining said first, second, third, fourth, fifth, and sixth modulated light beams with said combiner element to form a complete image; and directing said complete image through a print lens assembly to expose said photosensitive media.

2. A method according to claim 1, wherein said first light component is red light.

3. A method according to claim 1, wherein said second light component is green light.

4. A method according to claim 1, wherein said third light component is blue light.

5. A method according to claim 1, wherein said light source is a monochromatic light source.

6. A method according to claim 1, wherein said light source is switchable between producing monochromatic light and producing polychromatic light.

7. A method according to claim 1, wherein said light source is a halogen light source.

8. A method according to claim 1, wherein said light source is a broadband light source.

9. A method according to claim 1, wherein said light source is a two dimensional array of red, green, and blue LEDs.

10. A method according to claim 1, wherein said light source is at least one laser.

11. A method according to claim 1, wherein said light source provides imaging light which matches a media sensitivity of said photosensitive media.

12. A method according to claim 1, wherein said light source is provided for a period of time which matches a media sensitivity of said photosensitive media.

13. A method according to claim 1, wherein said separating of uniformized imaging light into first, second, and third light components is achieved with filters.

14. A method according to claim 1, wherein said separating of uniformized imaging light into first, second, and third light components is achieved with dichroics.

15. A method according to claim 1, wherein said combiner element consists of a cross prism.

16. A method according to claim 15, comprising the further steps of:

passing said polarized first modulated light component through a first blur filter to form a first blurred light component;

passing said polarized second modulated light component through a second blur filter to form a second blurred light component;

passing said polarized third modulated light component through a third blur filter to form a third blurred light component;

directing said first, second and third blurred light components towards a cross prism element;

combining said blurred first, second and third component light beams with a cross prism to form a complete image; and directing said complete image through a print lens assembly to expose said photosensitive media.

17. A method according to claim 1, wherein
said first spatial light modulator is located on a portion of a first facet of said first polarization beamsplitter and said second spatial light modulator is located on a portion of a second facet of said first polarization beamsplitter;
said third spatial light modulator is located on a portion of a first facet of said second polarization beamsplitter and said fourth spatial light modulator is located on a portion of a second facet of said second polarization beamsplitter; and
said fifth spatial light modulator is located on a portion of a first facet of said third polarization beamsplitter and said sixth spatial light modulator is located on a portion of a second facet of said third polarization beamsplitter.

18. A method according to claim 1, wherein each modulator is addressed color sequentially.

19. A method according to claim 1, comprising the further step of varying the illumination level.

20. A method according to claim 1, comprising the further step of varying the duration of exposure time.

21. A method according to claim 1, comprising the further steps of:
creating an image by exposing said photosensitive media;
repositioning said photosensitive media; and
exposing said photosensitive media.

22. A method according to claim 1, wherein said signals address said spatial light modulators for a period of time which matches a media sensitivity of said photosensitive media.

23. A method according to claim 1, wherein said first, second, third, fourth, fifth and sixth signals are processed simultaneously with each other.

24. A method according to claim 1, wherein the temperature of a least one spatial light modulator is modified to match a media sensitivity of said photosensitive media.

25. A method according to claim 1, wherein said first, second, third, fourth, fifth, and sixth signals to address said first, second, third, fourth, fifth, and sixth spatial light modulators are divided into separate bit-planes.

26. A method according to claim 1, comprising the further step of varying the backplane voltage of each spatial light modulator.

27. A method according to claim 1, wherein said first, second, third, fourth, fifth, and sixth spatial light modulators are each optimized for a discrete range of visible light wavelengths.

28. A method according to claim 1, wherein said first and second spatial light modulators are optimized for red light, said third and fourth spatial light modulators are optimized for green light, and said fifth and sixth spatial light modulators are optimized for blue wavelengths.

29. A method according to claim 1, wherein said spatial light modulators include a plurality of modulators sites, said modulator sites being adapted to rotate a polarization state of incident light, and reflect said light through said spatial light modulators and back to said polarization beamsplitter elements.

30. A method according to claim 29, comprising the further steps of:

moving at least one said spatial light modulator by an amount based on a size of an individual modulator site; and imaging said photosensitive media with new image data.

31. A method according to claim 30, wherein said first, second, third, fourth, fifth, and sixth spatial light modulators are moved in synchronization.

32. A method according to claim 29, wherein at least one said spatial light modulator is mounted on a frame which is movable in at least two directions.

33. A method according to claim 1, wherein
said first and said second spatial light modulators are simultaneously dithered, wherein said first polarization state of said first light component and said second polarization state of said first light component are of equal intensity and said first and second spatial light modulator addressing signals are the same;
said third and said fourth spatial light modulators are simultaneously dithered, wherein said first polarization state of said second light component and said second polarization state of said second light component are of equal intensity and said third and fourth spatial light modulator addressing signals are the same; and
said fifth and said sixth spatial light modulators are simultaneously dithered, wherein said first polarization state of said third light component and said second polarization state of said third light component are of equal intensity and said fifth and sixth spatial light modulator addressing signals are the same.

34. A method according to claim 1, wherein the bit depth of the image printed onto a photosensitive media is increased when:
said first and said second spatial light modulators are simultaneously dithered, wherein said first polarization state of said first light component and said second polarization state of said first light component are of unequal intensity and said first and second spatial light modulator addressing signals contain different data;
said third and said fourth spatial light modulators are simultaneously dithered, wherein said first polarization state of said second light component and said second polarization state of said second light component are of unequal intensity and said third and fourth spatial light modulator addressing signals contain different data; and
said fifth and said sixth spatial light modulators are simultaneously dithered, wherein said first polarization state of said third light component and said second polarization state of said third light component are of unequal intensity and said fifth and sixth spatial light modulator addressing signals contain different data.

35. A method according to claim 1, wherein the time required for dithering is reduced when:
said first spatial light modulator is dithered in a horizontal direction and said second spatial light modulators is dithered in a vertical direction;
said third spatial light modulator is dithered in a horizontal direction and said fourth spatial light modulators is dithered in a vertical direction; and
said fifth spatial light modulator is dithered in a horizontal direction and said sixth spatial light modulators is dithered in a vertical direction.

36. A method according to claim 1, wherein the resolution of the image printed onto a photosensitive media is increased when:
said first spatial light modulator is diagonally offset from said second spatial light modulator;

said third spatial light modulator is diagonally offset from said fourth spatial light modulator; and said fifth spatial light modulator is diagonally offset from said sixth spatial light modulator.

37. A method according to claim 1, wherein the print lens assembly magnifies the complete image onto the photosensitive media.

38. A method according to claim 1, wherein the print lens assembly demagnifies the complete image onto the photosensitive media.

39. A method according to claim 1, wherein the print lens assembly is swithchable between magnifying the complete image to demagnifying the complete image onto the photosensitive media.

40. A method of printing an image onto a photosensitive media comprising the steps of:

imaging red light from a light source through a uniformizing optics assembly to form uniformized red imaging light;

passing said uniformized red imaging light through a first polarization beamsplitter element to produce a first polarization state of said red light and a second polarization state of said red light;

passing said first polarized red light to a first spatial light modulator to create a telecentric illumination at said first spatial light modulator;

passing said second polarized red light to a second spatial light modulator to create a telecentric illumination at said second spatial light modulator;

addressing said first spatial light modulator with a first signal to create a first modulated red light beam and said second spatial light modulator with a second signal to create a second modulated red light beam;

passing said first modulated red light beam and said second modulated red light beam through said first polarized beamsplitting element;

imaging green light from a light source through a uniformizing optics assembly to form uniformized green imaging light;

passing said uniformized green imaging light through a second polarization beamsplitter element to produce a first polarization state of green light and a second polarization state of said green light;

passing said first polarized green light to a third spatial light modulator to create a telecentric illumination at said third spatial light modulator;

passing said second polarized green light to a fourth spatial light modulator to create a telecentric illumination at said fourth spatial light modulator;

addressing said third spatial light modulator with a third signal to create a first modulated green light beam and addressing said fourth spatial light modulator with a fourth signal to create a second modulated green light beam;

passing said first modulated green light beam and said second modulated green light beam through said second polarized beamsplitting element;

imaging blue light from a light source through a uniformizing optics assembly to form uniformized blue imaging light;

passing said uniformized blue imaging light through a third polarization beamsplitter element to produce a first polarization state of said blue light and a second polarization state of said blue light;

passing said first polarized blue light component to a fifth spatial light modulator to create a telecentric illumination at said fifth spatial light modulator;

passing said second polarized blue light component to a sixth spatial light modulator to create a telecentric illumination at said sixth spatial light modulator;

addressing said fifth spatial light modulator with a fifth signal to create a first modulated blue light beam and addressing said sixth spatial light modulator with a sixth signal to create a second modulated blue light beam;

passing said first and second modulated blue light beams through said third polarized beamsplitting element;

directing said first and second modulated red light beams, towards a combiner element;

directing said first and second modulated green light beams, towards a combiner element;

directing said first and second modulated blue light beams, towards a combiner element;

combining said first and second red, green and blue modulated light beams with a combiner to form a complete image; and directing said complete color image through a print lens assembly to expose said photosensitive media.

41. A method according to claim 40, wherein said light source is a monochromatic light source.

42. A method according to claim 40, wherein said light source is switchable between producing monochromatic light and producing polychromatic light.

43. A method according to claim 40, wherein said red light source is a halogen light source with a filtering apparatus that allows only red light to be emitted; wherein said green light source is a halogen light source with a filtering apparatus that allows only green light to be emitted; and wherein said blue light source is a halogen light source with filtering that allows only blue light to be emitted.

44. A method according to claim 40, wherein said red light source is a two dimensional array of red LEDs; wherein said green light source is a two dimensional array of green LEDs; and wherein said blue light source is a two dimensional array of blue LEDs.

45. A method according to claim 40, wherein said red light source is at least one laser capable of emitting red light; wherein said green light source is at least one laser capable of emitting green light; and wherein said blue light source is at least one laser capable of emitting blue light.

46. A method according to claim 40, wherein said light source provides imaging light which matches a media sensitivity of said photosensitive media.

47. A method according to claim 40, wherein said light source is provided for a period of time which matches a media sensitivity of said photosensitive media.

48. A method according to claim 40, wherein:

said first spatial light modulator is located on a portion of a first facet of said first polarization beamsplitter and said second spatial light modulator is located on a portion of a second facet of said first polarization beamsplitter;

said third spatial light modulator is located on a portion of a first facet of said second polarization beamsplitter and said fourth spatial light modulator is located on a portion of a second facet of said second polarization beamsplitter; and said fifth spatial light modulator is located on a portion of a first facet of said third polarization beamsplitter and said sixth spatial light modulator is located on a portion of a second facet of said third polarization beamsplitter.

49. A method according to claim 40, wherein each modulator is addressed color sequentially.

50. A method according to claim 40, comprising the further step of varying the illumination level.

51. A method according to claim 40, comprising the further step of varying the duration of exposure time.

52. A method according to claim 40, comprising the further steps of:
creating an image by exposing said photosensitive media;
repositioning said photosensitive media; and
exposing said photosensitive media.

53. A method according to claim 40, wherein said signals address said spatial light modulators for a period of time which matches a media sensitivity of said photosensitive media.

54. A method according to claim 40, wherein said first, second, third, fourth, fifth and sixth signals are processed simultaneously with each other.

55. A method according to claim 40, wherein the temperature of a least one spatial light modulator is modified to match a media sensitivity of said photosensitive media.

56. A method according to claim 40, wherein said first, second, third, fourth, fifth, and sixth signals to address said first, second, third, fourth, fifth, and sixth spatial light modulators are divided into separate bit-planes.

57. A method according to claim 40, comprising the further step of varying the backplane voltage of each spatial light modulator.

58. A method according to claim 40, wherein said first, second, third, fourth, fifth, and sixth spatial light modulators are each optimized for a discrete range of visible light wavelengths.

59. A method according to claim 40, wherein said first and second spatial light modulators are optimized for red light, said third and fourth spatial light modulators are optimized for green light, and said fifth and sixth spatial light modulators are optimized for blue wavelengths.

60. A method according to claim 40, wherein said spatial light modulators include a plurality of modulators sites, said modulator sites being adapted to rotate a polarization state of incident light, and reflect said light through said spatial light modulators and back to said polarization beamsplitter elements.

61. A method according to claim 60, comprising the further steps of:
moving at least one said spatial light modulator by an amount based on a size of an individual modulator site; and
imaging said photosensitive media with new image data.

62. A method according to claim 60, wherein at least one said spatial light modulator is mounted on a frame which is movable in at least two directions.

63. A method according to claim 62, wherein said first, second, third, fourth, fifth, and sixth spatial light modulators are moved in synchronization.

64. A method according to claim 40, wherein
said first and said second spatial light modulators are simultaneously dithered, wherein said first polarization state of said first light component and said second polarization state of said first light component are of equal intensity and said first and second spatial light modulator addressing signals are the same;
said third and said fourth spatial light modulators are simultaneously dithered, wherein said first polarization state of said second light component and said second polarization state of said second light component are of equal intensity and said third and fourth spatial light modulator addressing signals are the same; and
said fifth and said sixth spatial light modulators are simultaneously dithered, wherein said first polarization state of said third light component and said second polarization state of said third light component are of equal intensity and said fifth and sixth spatial light modulator addressing signals are the same.

65. A method according to claim 40, wherein the bit depth of the image printed onto a photosensitive media is increased when:
said first and said second spatial light modulators are simultaneously dithered, wherein said first polarization state of said first light component and said second polarization state of said first light component are of unequal intensity and said first and second spatial light modulator addressing signals contain different data;
said third and said fourth spatial light modulators are simultaneously dithered, wherein said first polarization state of said second light component and said second polarization state of said second light component are of unequal intensity and said third and fourth spatial light modulator addressing signals contain different data; and
said fifth and said sixth spatial light modulators are simultaneously dithered, wherein said first polarization state of said third light component and said second polarization state of said third light component are of unequal intensity and said fifth and sixth spatial light modulator addressing signals contain different data.

66. A method according to claim 40, wherein the time required for dithering is reduced when:
said first spatial light modulator is dithered in a horizontal direction and said second spatial light modulators is dithered in a vertical direction;
said third spatial light modulator is dithered in a horizontal direction and said fourth spatial light modulators is dithered in a vertical direction; and
said fifth spatial light modulator is dithered in a horizontal direction and said sixth spatial light modulators is dithered in a vertical direction.

67. A method according to claim 40, wherein the resolution of the image printed onto a photosensitive media is increased when:
said first spatial light modulator is diagonally offset from said second spatial light modulator;
said third spatial light modulator is diagonally offset from said fourth spatial light modulator; and
said fifth spatial light modulator is diagonally offset from said sixth spatial light modulator.

68. A method according to claim 40, comprising the further steps of:
passing said polarized first modulated light component through a first blur filter to form a first blurred light component;
passing said polarized second modulated light component through a second blur filter to form a second blurred light component;
passing said polarized third modulated light component through a third blur filter to form a third blurred light component;
directing said first, second and third blurred light components towards a combiner element;
combining said blurred first, second and third component light beams with a combiner element to form a complete image; and
directing said complete image through a print lens assembly to expose said photosensitive media.

69. A method according to claim 40, wherein the print lens assembly magnifies the complete image onto the photosensitive media.

70. A method according to claim 40, wherein the print lens assembly demagnifies the complete image onto the photosensitive media.

71. A method according to claim 40, wherein the print lens assembly is swithchable between magnifying the complete image to demagnifying the complete image onto the photosensitive media.

72. An apparatus for printing an image onto a photosensitive media comprising:
   a light source for providing light;
   a uniformizing optics assembly for uniformizing said light;
   a separator situated relative to said uniformizing optics, the separator capable of separating said uniformized light into first, second and third light components;
   a first polarizing beamsplitter element, wherein said first polarizing beamsplitter element separates said first light component into a first polarization state and a second polarization state;
   a first spatial light modulator, wherein said first spatial light modulator is illuminated by said first polarization state first light component in a telecentric manner and said first spatial light modulator creates first modulated light;
   a second spatial light modulator, wherein said second spatial light modulator is illuminated by said second polarization state first light component in a telecentric manner and said second spatial light modulator creates second modulated light;
   a first blur filter, capable of blurring said first modulated and said second modulated light;
   a second polarizing beamsplitter element, wherein said second polarizing beamsplitter element separates said second light component into a first polarization state and a second polarization state;
   a third spatial light modulator, wherein said third spatial light modulator is illuminated by said first polarization state second light component in a telecentric manner and said third spatial light modulator creates third modulated light;
   a fourth spatial light modulator, wherein said fourth spatial light modulator is illuminated by said second polarization state second light component in a telecentric manner and said fourth spatial light modulator creates fourth modulated light;
   a second blur filter, capable of blurring said third modulated light and said fourth modulated light;
   a third polarizing beamsplitter element, wherein said third polarizing beamsplitter element is capable of separating said third light component into a first polarization state and a second polarization state;
   a fifth spatial light modulator, wherein said fifth spatial light modulator is illuminated by said first polarization state third light component in a telecentric manner and said fifth spatial light modulator creates fifth modulated light;
   a sixth spatial light modulator, wherein said sixth spatial light modulator is illuminated by said second polarization state third light component in a telecentric manner and said sixth spatial light modulator creates sixth modulated light;
   a third blur filter, capable of blurring said fifth modulated light and said sixth modulated light;
   a combiner element, wherein said combiner element is capable of combining said blurred first, second, third, fourth, fifth, and sixth modulated light;
   a print lens, wherein said print lens directs said combined light to a photosensitive media; and
   wherein said imaging light from said light source is provided for a period of time which matches a media sensitivity of said photosensitive media.

73. An apparatus according to claim 72, wherein said light source is a monochromatic light source.

74. An apparatus according to claim 72, wherein said light source is switchable from providing monochromatic light to providing polychromatic light.

75. An apparatus according to claim 72, wherein said light source is a broadband visible source.

76. An apparatus according to claim 72, wherein said light source is a halogen light source.

77. An apparatus according to claim 72, wherein said light source is a two dimensional array of red, green, and blue LEDs.

78. An apparatus according to claim 72, wherein said light source is at least one laser.

79. An apparatus according to claim 72, wherein said separator of uniformized imaging light into first, second, and third light components is achieved with filters or dichroics.

80. An apparatus according to claim 72, wherein said separator consists of a red dichroic mirror and a blue dichroic mirror oriented in a cross configuration.

81. An apparatus according to claim 72, wherein said combiner prism is a cross prism.

82. An apparatus according to claim 72, wherein said spatial light modulators are comprised of modulator sites which are adapted to rotate a polarization state of incident light and reflect the light through the spatial light modulators and back to the beamsplitting elements.

83. An apparatus according to claim 72, wherein said first, second, and third spatial light modulators are each optimized for a discrete range of visible light wavelengths.

84. An apparatus according to claim 72, wherein said first and second spatial light modulators are optimized for red light, said third and fourth spatial light modulators are optimized for green light, and said fifth and sixth spatial light modulators are optimized for blue light.

85. An apparatus according to claim 72, wherein at least one said spatial light modulator is mounted on a frame which is movable in at least two directions.

86. An apparatus according to claim 72, further comprising:
   a polarization element located upstream from said first polarization beamsplitting element;
   a polarization element located upstream from said second polarization beamsplitting element; and
   a polarization element located upstream from said third polarization beamsplitting element.

87. An apparatus according to claim 72, further comprising:
   a polarization element located downstream from said first polarization beamsplitting element;
   a polarization element located downstream from said second polarization beamsplitting element; and
   a polarization element located downstream from said third polarization beamsplitting element.

88. An apparatus according to claim 72, wherein said print lens assemble magnifies the complete image onto the photosensitive media.

89. An apparatus according to claim 72, wherein said print lens assembly demagnifies the complete image onto the photosensitive media.

90. An apparatus according to claim 72, wherein said print lens assembly is switchable between a demagnifaction print lens assembly and a magnification print lens assembly.

91. An apparatus for printing an image onto a photosensitive media comprising:
a first light source for providing a first light wavelength;
a uniformizing optics assembly for uniformizing said first light wavelength;
a first polarizing beamsplitter element, wherein said first polarizing beamsplitter element separates said uniformized first light wavelength into a first polarization state and a second polarization state;
a first spatial light modulator, wherein said first spatial light modulator is illuminated by said first polarization state first light wavelength in a telecentric manner and said first spatial light modulator creates a first modulated light;
a second spatial light modulator, wherein said second spatial light modulator is illuminated by said second polarization state first light wavelength in a telecentric manner and said second spatial light modulator creates a second modulated light;
a first blur filter, capable of blurring said first modulated light and said second modulated light;
a second light source for providing a second light wavelength;
a uniformizing optics assembly for uniformizing said second light wavelength;
a second polarizing beamsplitter element, wherein said second polarizing beamsplitter element separates said uniformized second light wavelength into a first polarization state and a second polarization state;
a third spatial light modulator, wherein said third spatial light modulator is illuminated by said first polarization state second light wavelength in a telecentric manner and said third spatial light modulator creates a third modulated light;
a fourth spatial light modulator, wherein said fourth spatial light modulator is illuminated by said second polarization state second light wavelength in a telecentric manner and said fourth spatial light modulator creates a fourth modulated light;
a second blur filter, capable of blurring said third modulated light and said fourth modulated light;
a third light source for providing a third light wavelength;
a uniformizing optics assembly for uniformizing said third light wavelength;
a third polarizing beamsplitter element, wherein said third polarizing beamsplitter element is capable of separating said uniformized third light wavelength into a first polarization state and a second polarization state;
a fifth spatial light modulator, wherein said fifth spatial light modulator is illuminated by said first polarization state third light wavelength in a telecentric manner and said fifth spatial light modulator creates a fifth modulated light;
a sixth spatial light modulator, wherein said sixth spatial light modulator is illuminated by said second polarization state third light wavelength in a telecentric manner and said sixth spatial light modulator creates a sixth modulated light;
a third blur filter, capable of blurring said fifth modulated light and said sixth modulated light;
a combiner prism, wherein said combiner prism is capable of combining said blurred first, second, third, fourth, fifth and sixth modulated light;
a print lens, wherein said print lens directs said combined light to a photosensitive media; and
wherein said imaging light from said light source is provided for a period of time which matches a media sensitivity of said photosensitive media.

92. An apparatus according to claim 91, wherein at least one of said light sources is a monochromatic light source.

93. An apparatus according to claim 91, wherein at least one light source is switchable from providing monochromatic light to providing polychromatic light.

94. An apparatus according to claim 91, wherein:
said first light source is a broadband visible source with a filter to allow only red light to be emitted;
said second light source is a broadband visible source with a filter to allow only green light to be emitted; and
said third light source is a broadband visible source with a filter to allow only blue light to be emitted.

95. An apparatus according to claim 91, wherein:
said first light source is a broadband visible source with a switchable filter to allow red, green or blue light to be emitted;
said second light source is a broadband visible source with a switchable filter to allow red, green or blue light to be emitted; and
said third light source is a broadband visible source with a switchable filter to allow red, green or blue light to be emitted.

96. An apparatus according to claim 91, wherein:
said first light source is a halogen light source with a filter to allow only red light to be emitted;
said second light source is a halogen light source with a filter to allow only green light to be emitted; and
said third light source is a halogen light source with a filter to allow only blue light to be emitted.

97. An apparatus according to claim 91, wherein:
said first light source is a halogen light source with a switchable filter to allow red, green or blue light to be emitted;
said second light source is a halogen light source with a switchable filter to allow red, green or blue light to be emitted; and
said third light source is a halogen light source with a switchable filter to allow red, green or blue light to be emitted.

98. An apparatus according to claim 91, wherein said first, second and third light sources are a two dimensional array of red, green, and blue LEDs.

99. An apparatus according to claim 91, wherein said first light source is an array of red LEDs.

100. An apparatus according to claim 91, wherein said second light source is an array of green LEDs.

101. An apparatus according to claim 91, wherein said third light source is an array of blue LEDs.

102. An apparatus according to claim 91, wherein said first, second and third light sources are at least one laser.

103. An apparatus according to claim 91, wherein said first light source is a laser that emits red light.

104. An apparatus according to claim 91, wherein said second light source is a laser that emits green light.

105. An apparatus according to claim 91, wherein said third light source is a laser that emits blue light.

106. An apparatus according to claim 91, wherein said first, second and third light source are capable of emitting red, green and blue light.

107. An apparatus according to claim 91, wherein said combiner prism is a cross prism.

108. An apparatus according to claim 91, wherein said spatial light modulators are comprised of modulator sites which are adapted to rotate a polarization state of incident light and reflect the light through the spatial light modulators and back to the beamsplitting elements.

109. An apparatus according to claim 91, wherein said first, second, third, fourth, fifth, and sixth spatial light modulators are each optimized for a discrete range of visible light wavelengths.

110. An apparatus according to claim 91, wherein said first and second spatial light modulators are optimized for red light, said third and fourth spatial light modulators are optimized for green light, and said fifth and sixth spatial light modulators are optimized for blue light.

111. An apparatus according to claim 91, wherein at least one said spatial light modulator is mounted on a frame which is movable in at least two directions.

112. An apparatus according to claim 91, further comprising:
a polarization element located upstream from said first polarization beamsplitting element;
a polarization element located upstream from said second polarization beamsplitting element; and
a polarization element located upstream from said third polarization beamsplitting element.

113. An apparatus according to claim 91, further comprising:
a polarization element located downstream from said first polarization beamsplitting element;
a polarization element located downstream from said second polarization beamsplitting element; and
a polarization element located downstream from said third polarization beamsplitting element.

114. An apparatus according to claim 91, wherein said print lens assembly magnifies the complete image onto the photosensitive media.

115. An apparatus according to claim 91, wherein said print lens assembly demagnifies the complete image onto the photosensitive media.

116. An apparatus according to claim 91, wherein said print lens assembly is switchable between a demagnifaction print lens assembly and a magnification print lens assembly.

* * * * *